United States Patent
Abe

(10) Patent No.: US 12,172,080 B2
(45) Date of Patent: Dec. 24, 2024

(54) STORAGE MEDIUM, INFORMATION PROCESSING SYSTEM, INFORMATION PROCESSING APPARATUS, AND GAME PROCESSING METHOD

(71) Applicant: Nintendo Co., Ltd., Kyoto (JP)

(72) Inventor: Goro Abe, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 218 days.

(21) Appl. No.: 17/404,567

(22) Filed: Aug. 17, 2021

(65) Prior Publication Data
US 2022/0152503 A1 May 19, 2022

(30) Foreign Application Priority Data

Nov. 19, 2020 (JP) .................. 2020-192537
Nov. 19, 2020 (JP) .................. 2020-192538

(51) Int. Cl.
*A63F 13/56* (2014.01)
*A63F 13/58* (2014.01)
*A63F 13/837* (2014.01)

(52) U.S. Cl.
CPC .............. *A63F 13/56* (2014.09); *A63F 13/58* (2014.09); *A63F 13/837* (2014.09)

(58) Field of Classification Search
CPC ........ A63F 13/56; A63F 13/58; A63F 13/837; A63F 13/57; A63F 13/50; A63F 13/52; A63F 13/525; A63F 2300/65; A63F 2300/6607; A63F 13/69; A63F 13/697; A63F 13/577; A63F 13/55; A63F 13/53; A63F 13/45
See application file for complete search history.

(56) References Cited

U.S. PATENT DOCUMENTS 5,498,002 A * 3/1996 Gechter ................. A63F 13/45
463/31
6,755,743 B1 6/2004 Yamashita et al.
(Continued)

FOREIGN PATENT DOCUMENTS

JP 2000342855 A 12/2000
JP 2002085845 A 3/2002
(Continued)

OTHER PUBLICATIONS

JP 2000-342855 A, machine translation, downloaded from https://www.j-platpat.inpit.go.jp/, Apr. 2, 2024.*
(Continued)

*Primary Examiner* — David L Lewis
*Assistant Examiner* — Matthew D Hoel
(74) *Attorney, Agent, or Firm* — Scully, Scott, Murphy & Presser, P.C.

(57) ABSTRACT

An example of an information processing system determines a usage character to be operated by a player from among a plurality of characters whose operation methods are different from each other. The information processing system executes a game by controlling a motion of the usage character in a virtual space, based on an operation by the player. The information processing system, during execution of the game, changes the usage character to a different character among the plurality of characters. Thus, the game operation during the game can be varied, thereby increasing the variations of game operations.

46 Claims, 22 Drawing Sheets

(56) References Cited

U.S. PATENT DOCUMENTS

| | | | | |
|---|---|---|---|---|
| 9,498,705 | B2* | 11/2016 | May | A63F 13/212 |
| 10,918,944 | B2* | 2/2021 | Suzuki | A63F 13/211 |
| 10,981,057 | B2* | 4/2021 | Hirose | A63F 13/79 |
| 11,020,675 | B2* | 6/2021 | Suzuki | A63F 13/533 |
| 11,173,403 | B2* | 11/2021 | Sakurai | A63F 13/5372 |
| 2004/0166937 | A1 | 8/2004 | Rothschild et al. | |
| 2004/0242294 | A1* | 12/2004 | Shiozawa | A63F 13/828 463/9 |
| 2007/0270219 | A1 | 11/2007 | Sugioka et al. | |
| 2011/0124409 | A1* | 5/2011 | Baynes | A63F 13/67 463/43 |
| 2012/0146992 | A1* | 6/2012 | Maeta | H04N 13/156 345/419 |
| 2012/0231888 | A1* | 9/2012 | Abe | H04L 67/131 463/42 |
| 2014/0171201 | A1* | 6/2014 | May | A63F 13/212 463/36 |
| 2016/0030847 | A1* | 2/2016 | Odate | A63F 13/58 463/31 |
| 2019/0070502 | A1* | 3/2019 | Hirose | A63F 13/45 |
| 2019/0299099 | A1 | 10/2019 | Oshino et al. | |
| 2019/0366211 | A1* | 12/2019 | Suzuki | A63F 13/25 |
| 2019/0366221 | A1* | 12/2019 | Suzuki | A63F 13/88 |
| 2020/0114267 | A1* | 4/2020 | Sakurai | A63F 13/5372 |
| 2020/0230496 | A1 | 7/2020 | Hayashi et al. | |
| 2020/0376383 | A1* | 12/2020 | Guimaraes | G06T 13/40 |
| 2021/0205706 | A1* | 7/2021 | Lutz | A63F 13/57 |
| 2022/0152502 | A1* | 5/2022 | Abe | A63F 13/58 |
| 2023/0191255 | A1* | 6/2023 | Iwao | A63F 13/825 463/31 |
| 2024/0058701 | A1* | 2/2024 | Ohmori | A63F 13/42 |

FOREIGN PATENT DOCUMENTS

| | | |
|---|---|---|
| JP | 2010088641 A | 4/2010 |
| JP | 2010119519 A | 6/2010 |
| JP | 2012081154 A | 4/2012 |
| JP | 2014121487 A | 7/2014 |
| JP | 2019097583 A | 6/2019 |
| JP | 2019171013 A | 10/2019 |
| JP | 2020116040 A | 8/2020 |

OTHER PUBLICATIONS

JP 2002-085845 A, machine translation, downloaded from https://www.j-platpat.inpit.go.jp/, Apr. 2, 2024.*
JP 2010-119519 A, machine translation, downloaded from https://www.j-platpat.inpit.go.jp/, Apr. 2, 2024.*
JP 2019-097583 A, machine translation, downloaded from https://www.j-platpat.inpit.go.jp/, Apr. 2, 2024.*
"WarioWare Gold", online, Nintendo Co., Ltd., searched on Sep. 29, 2020, internet <https://www.nintendo.com/games/detail/warioware-gold-3ds>, printed Aug. 17, 2021.
U.S. Appl. No. 17/404,559, filed Aug. 17, 2021.
Notice of Reasons for Refusal dated Mar. 15, 2024 received in Japanese Patent Application No. JP 2020-192537.
Matsuura, K. et al., "Action Game Algorithm Maniacs", first edition, SB Creative Corp., May 30, 2007, pp. 406 and 413, ISBN:978-4-7973-3895-9.
Notice of Reasons for Refusal dated Nov. 17, 2023 received in Japanese Patent Application No. JP 2020-192538.
Zelda, M., "Weekly Famitsu 2014 7/10 Special Issue", Kadokawa Corporation, Jun. 26, 2014, vol. 29, No. 28, pp. 212-215.
"Vigilante 8", "Weekly Famitsu 1998 11/27", ASCII, Nov. 27, 1998, vol. 13, No. 48, p. 120.
Notice of Reasons for Refusal dated Nov. 17, 2023 received in Japanese Patent Application No. JP 2020-192537.
Notice of Reasons for Refusal dated Mar. 1, 2024 received in Japanese Patent Application No. JP 2020-192538.
"Final Fantasy Crystal Chronicles Echoes of Time Perfect Guide", 1st edition, Enterbrain Inc., Mar. 10, 2009, p. 198, ISBN:978-4-7577-4753-1.

* cited by examiner

STORAGE MEDIUM, INFORMATION PROCESSING SYSTEM, INFORMATION PROCESSING APPARATUS, AND GAME PROCESSING METHOD

CROSS REFERENCE TO RELATED APPLICATION

This application claims priority to Japanese Patent Applications No. 2020-192537 and No. 2020-192538, filed on Nov. 19, 2020, the entire contents of which are incorporated herein by reference.

FIELD

The technique shown here relates to a storage medium, an information processing system, an information processing apparatus, and a game processing method which enable a player to perform a plurality of types of games.

BACKGROUND AND SUMMARY

Conventionally, there is a game program which enables a player to perform a plurality of types of games having different operation methods.

Regarding such games, there is room for improvement in increasing the variations of game operations.

Therefore, the present application discloses a storage medium, an information processing system, an information processing apparatus, and a game processing method capable of increasing the variations of game operations.

(1) An example of a non-transitory computer-readable storage medium stores a game program. The game program causes a processor of an information processing apparatus to execute: determining a usage character to be operated by a player from among a plurality of characters whose operation methods are different from each other; executing a game by controlling a motion of the usage character in a virtual space, based on an operation by the player; and during execution of the game, changing the usage character to a different character among the plurality of characters.

According to the configuration of the above (1), during the game, the character being used by the player is changed to another character whose operation method is different from that of the above character. Thus, the game operation during the game can be varied, thereby increasing the variations of game operations.

(2) The game program may cause the processor to execute, during execution of the game, automatically determining a post-change usage character from among the plurality of characters.

According to the configuration of the above (2), it is possible to provide a new and highly entertaining game during which the usage character is changed to a character that is not intended by the player.

(3) The game program may cause the processor to execute determining the usage character at random from among the plurality of characters.

According to the configuration of the above (3), it becomes difficult for the player to predict a usage character that he/she will use next, whereby the entertainment characteristics of the game during which the usage character is changed can be further enhanced.

(4) The game program may cause the processor to execute, during execution of the game, changing the usage character according to a lapse of time in the game.

According to the configuration of the above (4), the operation method of the game is changed according to the lapse of time in the game, whereby the entertainment characteristics of the game can be enhanced.

(5) The game program may cause the processor to further execute, during execution of the game, displaying an image indicating a timing at which the usage character is changed according to the lapse of time in the game.

According to the configuration of the above (5), the change timing of the usage character can be notified to the player.

(6) The game program may cause the processor to execute: executing the game by controlling, based on operations of a plurality of players, motions of usage characters corresponding to the respective players in the virtual space; and during execution of the game, changing each of the usage characters to a character, among the plurality of characters, which is different from the usage character that is currently used.

According to the configuration of the above (6), in the game played by the plurality of players, the game operation of each player can be varied. Moreover, since the usage character of each player is changed, the fairness among the players can be ensured.

(7) The game program may cause the processor to further execute: during execution of the game, automatically determining a plurality of candidate characters to be candidates of the usage characters from among the plurality of characters; during execution of the game, displaying the plurality of candidate characters; and during execution of the game, determining post-change usage characters of the respective players from among the plurality of candidate characters, according to instructions of the plurality of players.

According to the configuration of the above (7), since the candidate characters are presented to the players, it is possible to, before the change of the usage character, give each player an opportunity to think of a strategic method for the game after the change of the usage character. Thus, the strategic characteristics of the game can be enhanced.

(8) The game program may cause the processor to execute, when the usage character has acquired a predetermined item in the virtual space during execution of the game, changing the usage character to a character associated with the acquired item among the plurality of characters.

According to the configuration of the above (8), the player is allowed to easily select whether or not to change the usage character, and moreover, is allowed to easily determine a timing to change the usage character.

(9) The game program may cause the processor to execute, during execution of the game, changing each of the usage characters respectively used by the plurality of players to a common character selected from the plurality of characters.

According to the configuration of the above (9), the conditions for the game can be made fair among the players.

(10) The plurality of characters may be different from each other in a movement method according a direction input and a predetermined instruction input different from the direction input. The game program may cause the computer to further execute, during execution of the game, performing a movement control for the usage character in the virtual space, according to a movement method corresponding to the usage character, based on the direction input and the instruction input.

According to the configuration of the above (10), since the fundamental motion, "movement", differs among the characters, the operability of the game greatly differs depending on which usage character is used in the game. Thus, the variations of game operations can be increased.

(11) The game program may cause the processor to execute performing, as a movement control for at least any of the plurality of characters, a movement control by using at least any of: a method of moving the usage character in a direction according to the direction input; a method of moving the usage character in a predetermined direction according to a combination of the direction input and the instruction input; and a method of automatically moving the usage character.

(12) The game program may cause the processor to further execute performing, as a control for an attack motion of at least any of the plurality of characters, a control for an attack motion of shooting an attack object automatically or according to the instruction input.

According to the configuration of the above (12), the variations of motions of the respective usage characters can be increased, thereby increasing the variations of games using the usage characters.

(13) The game program may cause the processor to further execute: performing, for each of the plurality of characters, a control of causing a predetermined object in the virtual space to generate a predetermined effect when the character has come into contact with the predetermined object; and performing, for a character that shoots the attack object among the plurality of characters, a control of causing the predetermined object to generate an effect when the attack object has come into contact with the predetermined object, the effect being the same as the effect generated when the character has come into contact with the predetermined object.

According to the configuration of the above (13), it is possible to avoid an inconvenient situation that the game cannot be cleared by a character incapable of shooting an attack object.

(14) The game program may cause the processor to execute, during execution of the game, if a post-change usage character is a predetermined character that shoots the attack object, disposing an object for movement in the virtual space, and performing a movement control for moving the predetermined character toward the object for movement when the attack object has come into contact with the object for movement.

According to the configuration of the above (14), since the usage character, which moves in a movement method different from a movement method in which a character moves according to a direction input, is provided, the variations of motions taken by the usage characters can be increased, thereby increasing the variations of games using the usage characters.

(15) The plurality of characters may include a character of a first type that is influenced by gravity in the virtual space, and a character of a second type that is not influenced by gravity in the virtual space. The game program may cause the processor to execute, when the usage character is the character of the first type, performing a movement control for the usage character with an influence of gravity being reflected during execution of the game.

According to the configuration of the above (15), the two types of characters with which the player has different operation feelings are used as the usage characters, thereby increasing the variations of games using the usage characters.

This specification discloses examples of an information processing apparatus and an information processing system which execute the processes in the above (1) to (15). This specification also discloses an example of a game processing method for executing the processes in the above (1) to (15).

According to the storage medium, the information processing system, the information processing apparatus, and the game processing method, it is possible to increase the variations of game operations.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
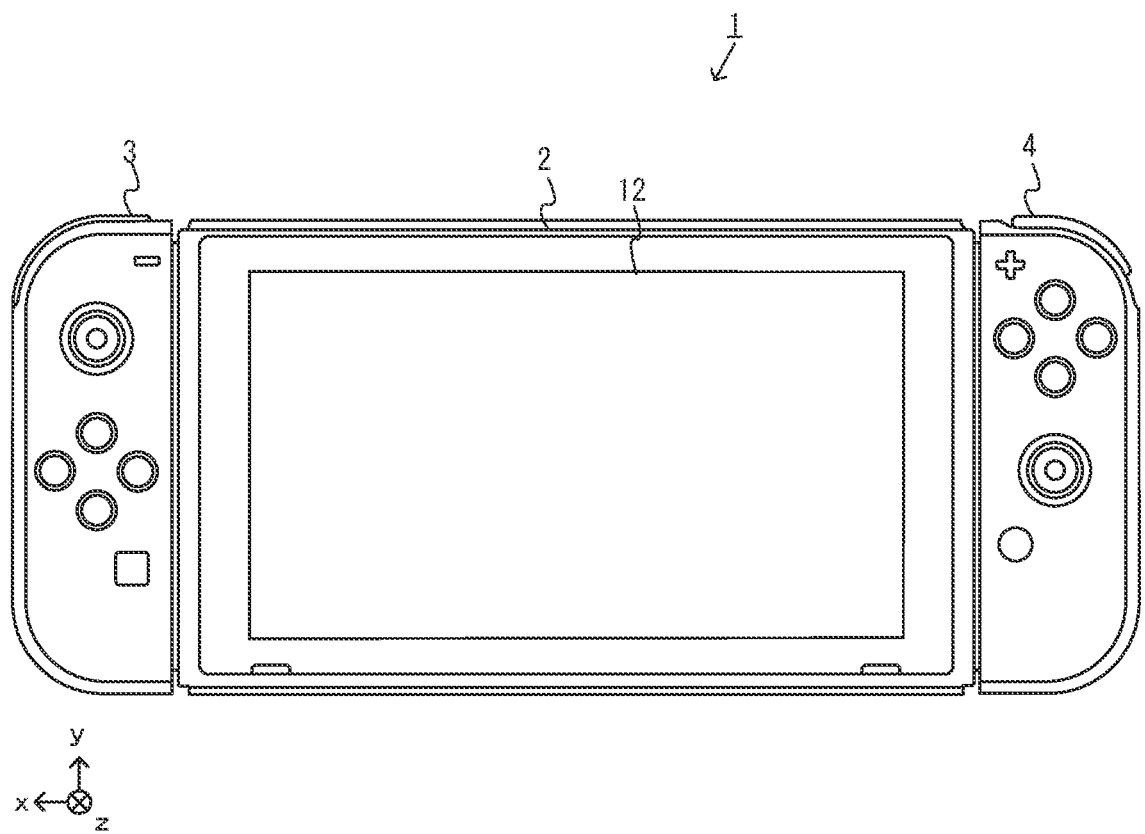
FIG. 1 is a diagram showing an example of a state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
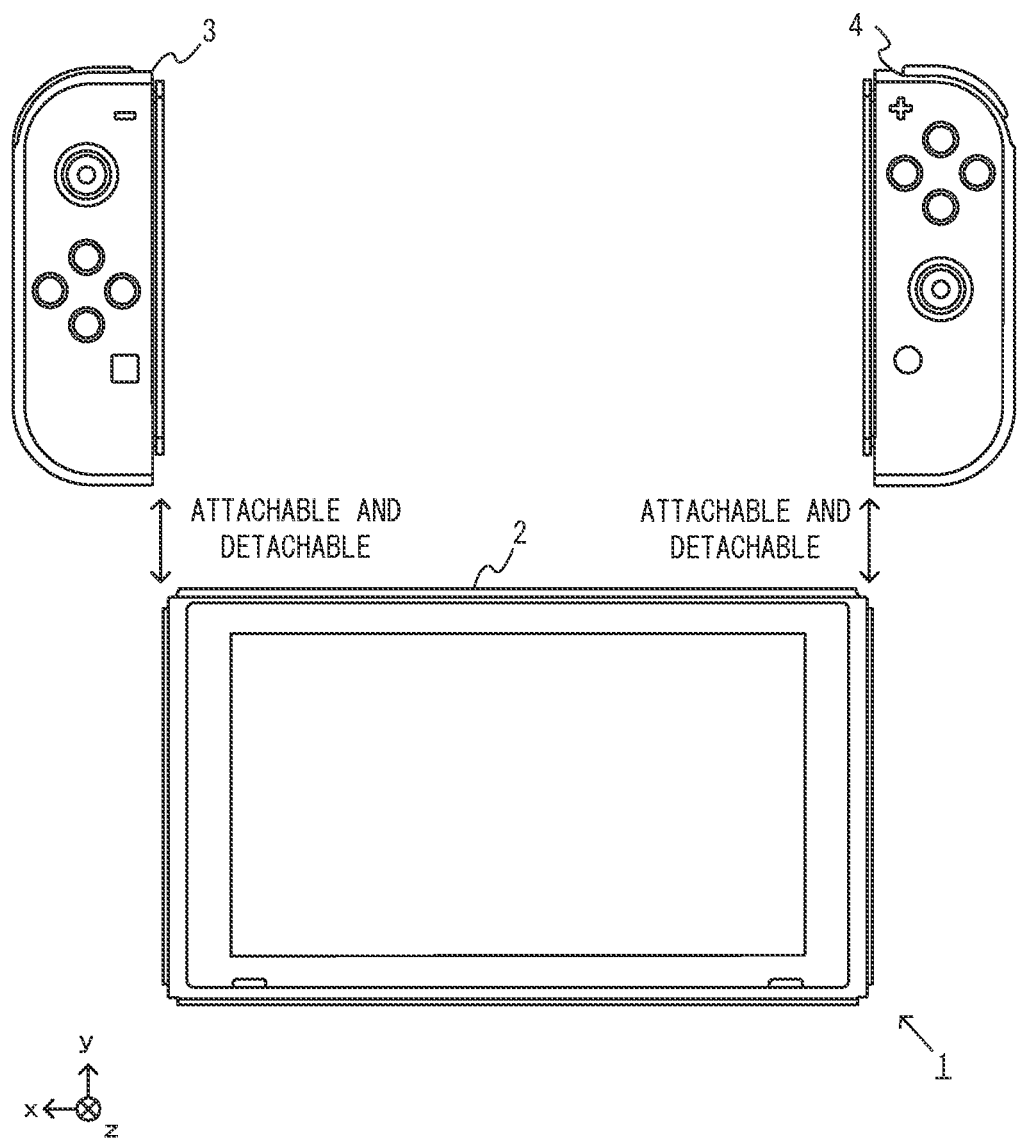
FIG. 2 is a diagram showing an example of a state where each of a non-limiting left controller and a non-limiting right controller is detached from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
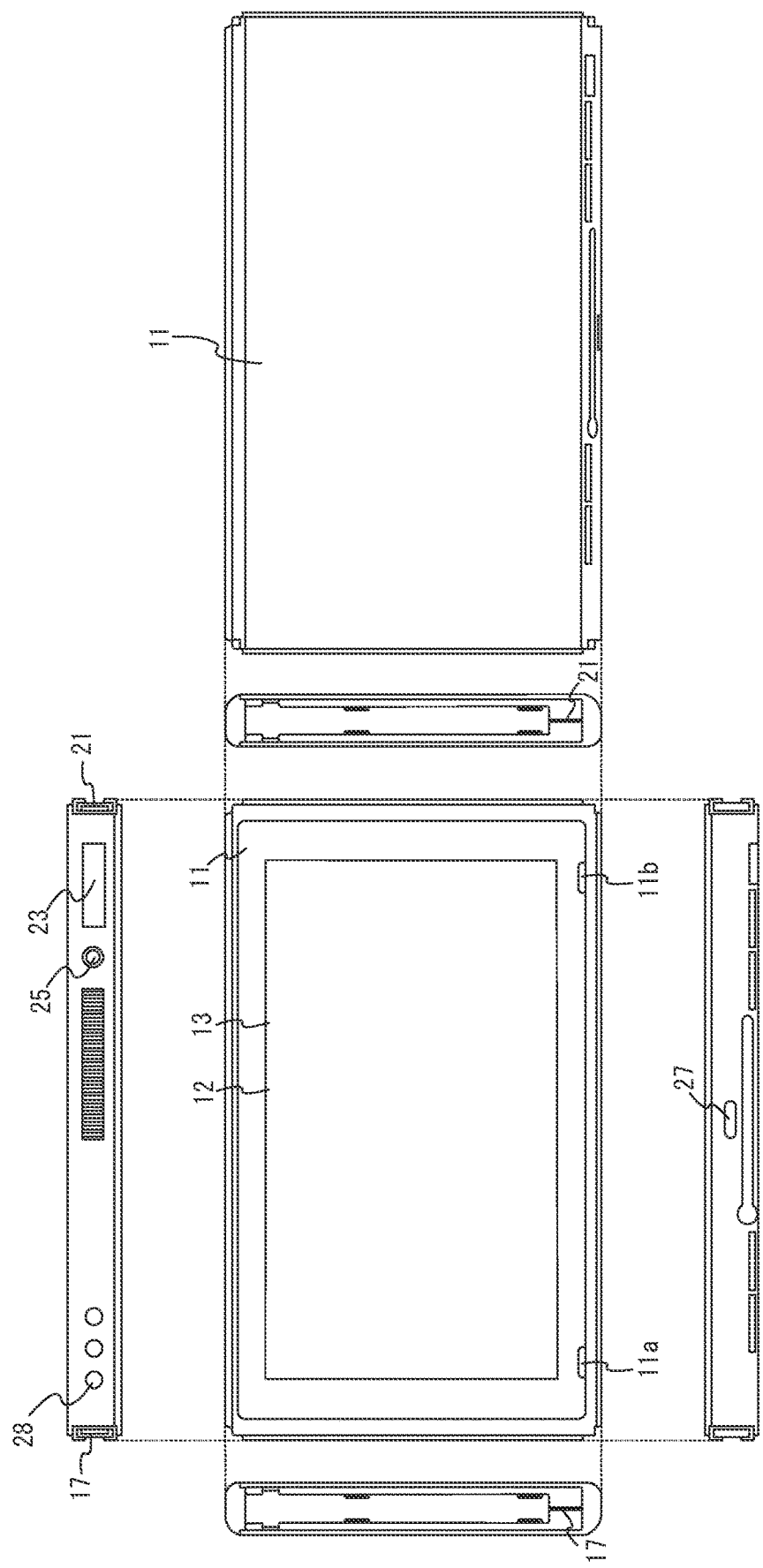
FIG. 3 is six orthogonal views showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
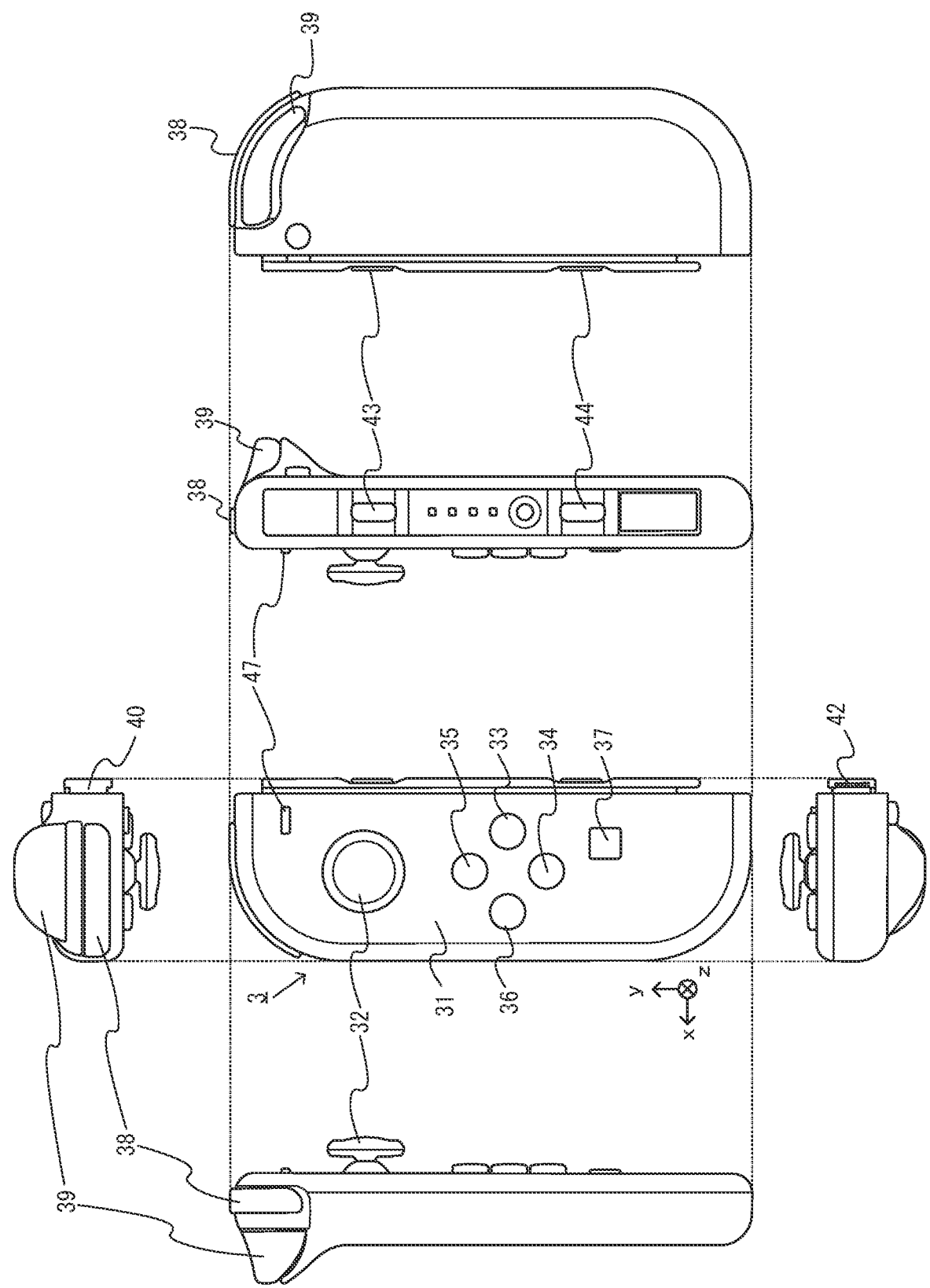
FIG. 4 is six orthogonal views showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
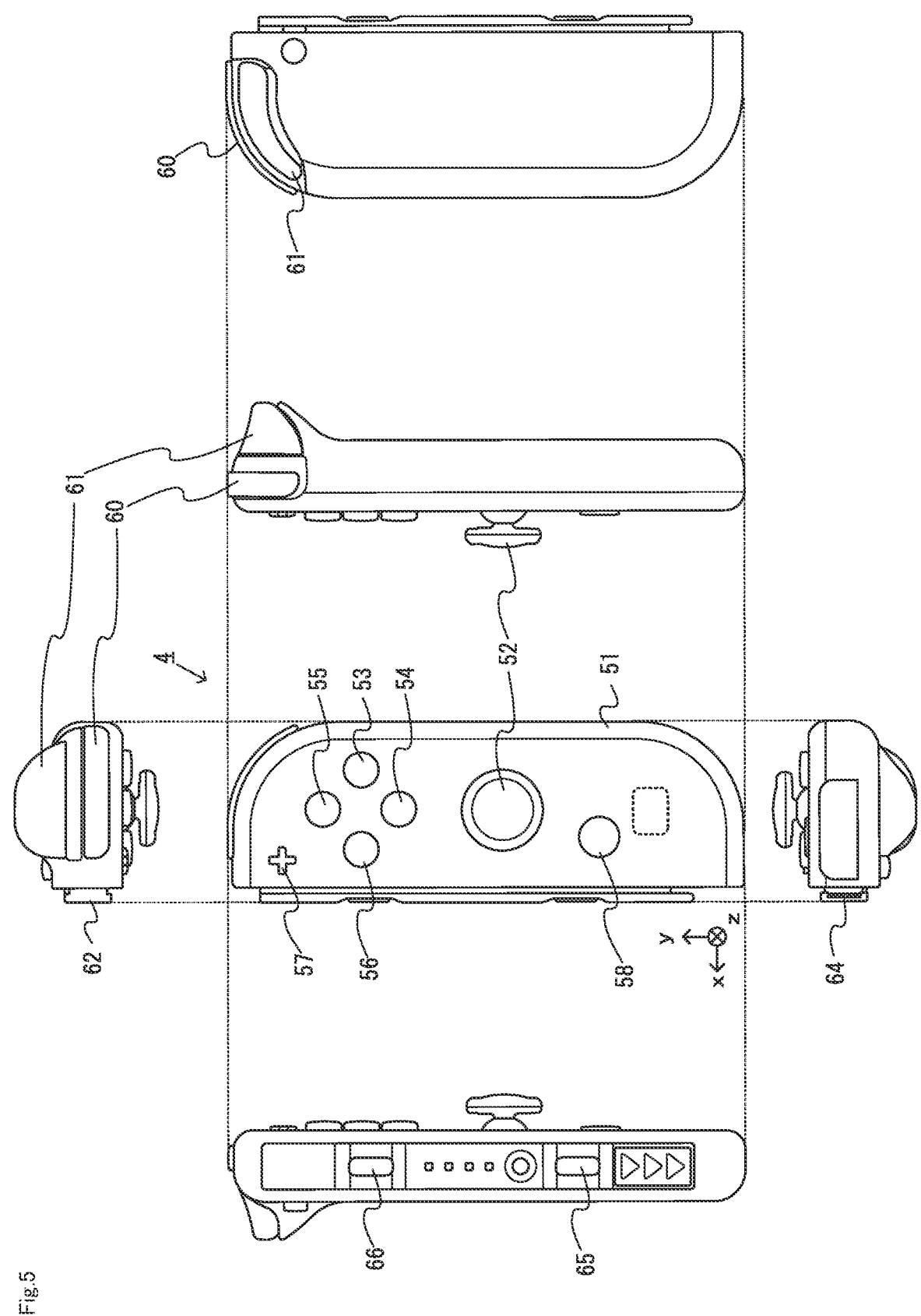
FIG. 5 is six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
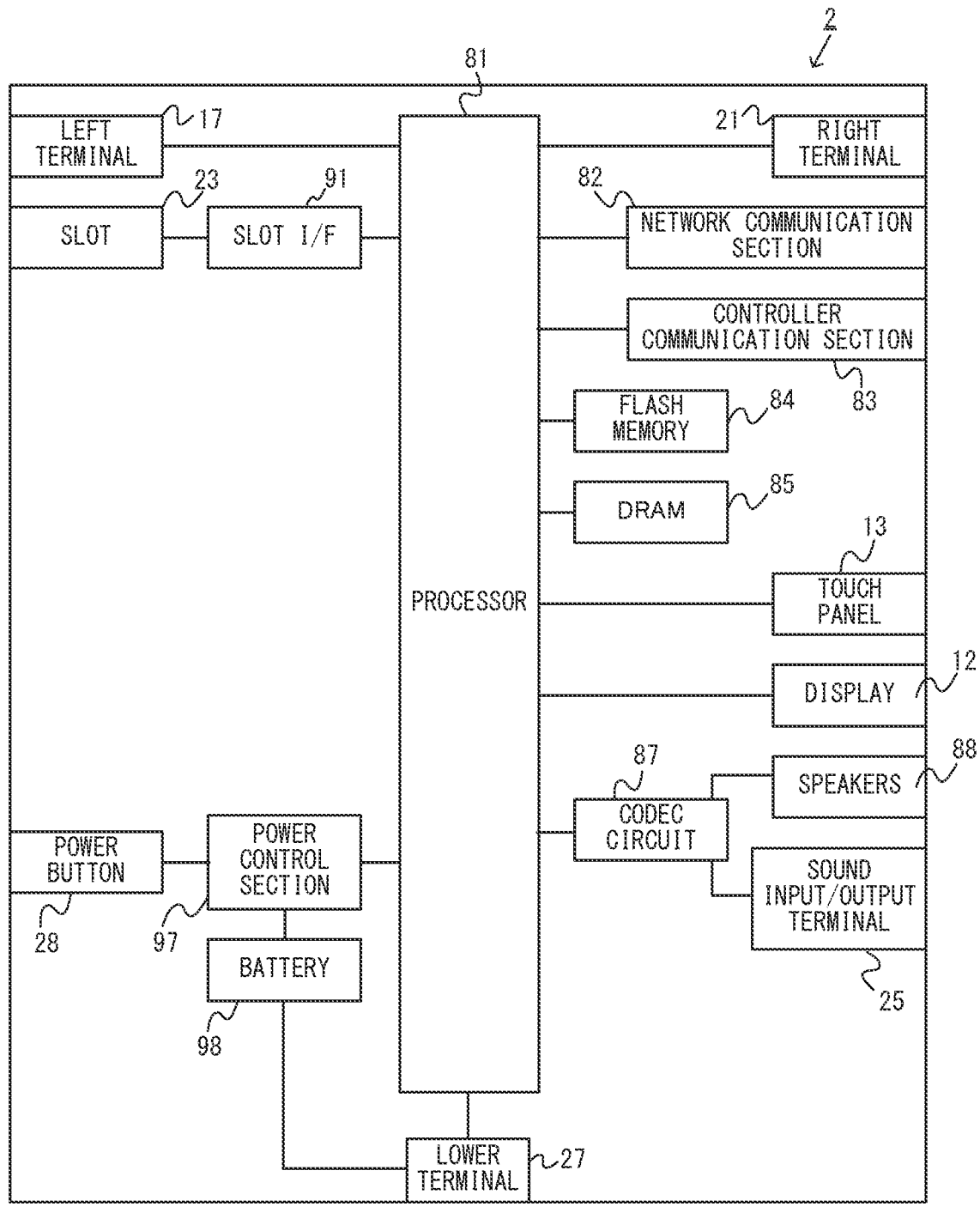
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
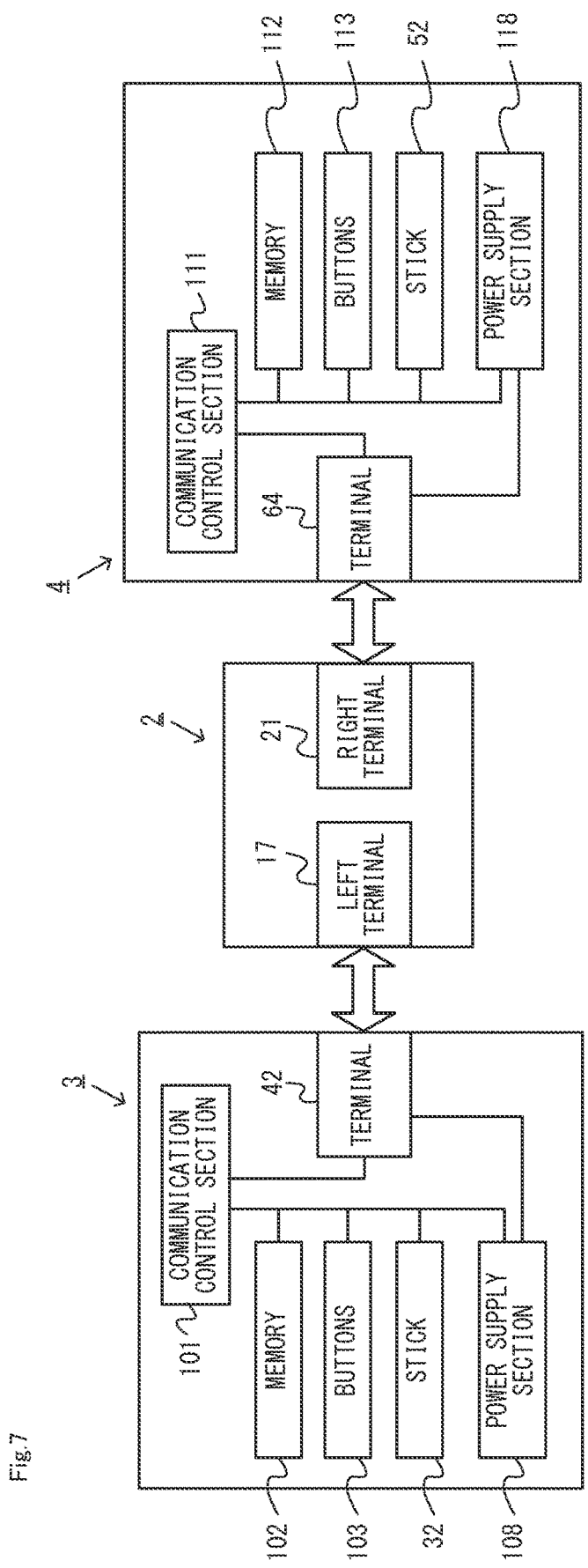
FIG. 7 is a block diagram showing examples of internal configurations of a non-limiting main body apparatus, a non-limiting left controller, and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, and, the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and, the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Outline of Processing in Game System]

Next, an outline of game processing executed in a game system 1 will be described with reference to FIGS. 8 to 17. A plurality of types of characters are prepared in a game program as usage character (also referred to as player characters) to be used by a player (i.e., a user of the game system 1) in a game. Moreover, in the exemplary embodiment, a plurality of types of games are prepared in the game program. In each game, the player plays the game by using a plurality of types of characters as usage characters.

[2-1. Character]

Firstly, the plurality of types of characters are described. In the exemplary embodiment, the respective characters are different in the operation method. For example, character's movement (e.g., the direction or method of movement) according to a direction input made by the player differs among the characters, or character's motion according to a predetermined motion instruction input made by the player differs among the characters. In the exemplary embodiment, 18 types of characters are prepared. The number of characters to be prepared is arbitrary, and may be any number not less than 2.

As described above, the operation methods of the respective characters are different from each other. In the exemplary embodiment, motions of the 18 types of characters A to R are controlled according to an input to an analog stick (i.e., the analog stick 32 or 52 of the controller 3 or 4) for inputting a direction, and an input to a predetermined button (e.g., the left direction button 36 of the left controller 3 or the A-button 53 of the right controller 4, which is referred to as "motion instruction button" hereinafter) for performing the motion instruction input. Specifically, the motions of the 18 types of characters A to R are controlled according to the following operation methods.

(Character A)

This character:

Moves while changing the direction, according to an input to the analog stick. This movement may be limited in the left-right direction.

Rushes in the direction that it faces, according to an input to the motion instruction button.

Is not influenced by gravity (i.e., does not fall even when it is in mid-air).

(Character B)

This character:

Moves while changing the direction, according to left and right inputs to the analog stick.

Jumps according to an input to the motion instruction button.

Is influenced by gravity (i.e., falls when it is in mid-air).

(Character C)

This character:

Faces a direction in which an input is made to the analog stick. When there is no input, the character C faces the front.

Shoots a bullet in the direction that it faces, according to an input to the motion instruction button.

Is influenced by gravity.

(Character D)

This character:

Moves while changing the direction, according to an input to the analog stick.

Throws a boomerang, according to an input to the motion instruction button (after the boomerang is thrown, the boomerang returns).

Cannot move while the boomerang is thrown, and the boomerang moves according to an input to the analog stick.

Is not influenced by gravity.

(Character E)

This character:

Moves according to an input to the analog stick (this character always faces to the right).

Shoots a bullet rightward, according to an input to the motion instruction button.

Is not influenced by gravity.

(Character F)

This character:

Changes the direction according to an input to the analog stick.

Moves in the direction that it faces, according to an input to the motion instruction button, while the input is performed.

Is influenced by gravity.

(Character G)

This character:

Automatically moves in the horizontal direction regardless of an input to the analog stick (but stops while it takes out a yo-yo).

Moves in the opposite direction when it hits a wall or the like.

Shoots a yo-yo upward, according to an input to the motion instruction button.

Is influenced by gravity.

(Character H)

This character:

Moves according to an input to the analog stick.

Shoots a bullet upward, according to an input to the motion instruction button.

Is not influenced by gravity.

(Character I)

This character:

Moves according to left and right inputs to the analog stick, while constantly repeating jumping (this character always faces to the right).

Shoots a bullet rightward, according to an input to the motion instruction button.

Is influenced by gravity.

(Character J)

This character:

Changes the direction according to an input to the analog stick.

Rushes in the direction that it faces, according to an input to the motion instruction button.

Is influenced by gravity.

(Character K)
This character:
Moves while changing the direction, according to an input to the analog stick.
Shoots a bullet in the direction that it faces, according to an input to a predetermined button.
Is not influenced by gravity.

(Character L)
This character:
Moves according to an input to the analog stick.
Emits a light beam downward, according to an input to the motion instruction button, while the input is performed (an object hit by the light beam is drawn upward).
Is not influenced by gravity.

(Character M)
This character:
Moves an aim according to an input to the analog stick.
Moves to the position of the aim, according to an input to the motion instruction button.
Is influenced by gravity.

(Character N)
This character:
Moves while changing the direction, according to an input to the analog stick.
Drops a bomb according to an input to the motion instruction button.
Is not influenced by gravity.

(Character O)
This character:
Moves while changing the direction, according to left and right inputs to the analog stick.
Jumps according to an input to the motion instruction button.
Is influenced by gravity.
Can stick to a ceiling when it jumps, and the direction of gravity with respect to this character is inverted while it sticks to the ceiling.

(Character P)
This character:
Moves while changing the direction, according to left and right inputs to the analog stick. This character steeply falls according to a downward input while it is in mid-air.
Moves upward according to an input to the motion instruction button.
Is influenced by gravity.

(Character Q)
This character:
Discharges a stream of water according to an input to the analog stick, and moves in a direction opposite to the water discharge direction.
Switches between discharge and stop of the stream of water, according to an input to the motion instruction button.
Is influenced by gravity.
Stops without being influenced by gravity when the scream of water is stopped.

(Character R)
This character:
Moves while changing the direction, according to left and right inputs to the analog stick.
Thrusts its tongue out obliquely upward with respect to the advancing direction, according to an input to the motion instruction button, while the input is performed.
Is influenced by gravity.

As described above, the respective characters are different in the operation method. The phrase "different in the operation method" means: (a) different in a motion (including movement) that each character performs in response to an input by the player; (b) different in a motion that each character can take; and (c) different in a rule regarding a motion that each character performs (e.g., whether or not the motion of the character is caused by an influence of gravity). In the exemplary embodiment, some characters (e.g., the character A) move according to an input to the analog stick so as to move in the input direction while others (e.g., the character C) just face the input direction. In addition, a motion that each character performs according to an input to the motion instruction button also varies. Therefore, depending on which character is used, the strategic method and the fun factor of a game significantly varies, thereby increasing the variations of games.

In the exemplary embodiment, the respective characters can be operated according to inputs to the analog sticks and the motion instruction button on the controllers although the operation methods thereof are different from each other. That is, the game system 1 controls the motions of the characters according to inputs to the analog sticks and the motion instruction button, and does not control them according to other inputs. Therefore, the player, who does not grasp the operations for the characters, can try to perform input operations to the analog sticks and the motion instruction button for any character, and thus can grasp the operation methods for the characters. Thus, even when multiple characters to be operated by various operation methods are prepared, the player can easily grasp the operations for the respective characters.

In the exemplary embodiment, the 18 types of characters are prepared on assumption that the game is played by a single player. In another embodiment, the game may be played by a plurality of players, and a usage character may be automatically determined for each player, thereby further increasing the variations. In the case of two players, as for a certain character (specifically, the character E or the character I always facing to the right), if this character is selected for the second player, this character may be changed to another character that faces to the left. In the case of two players, the initial position of a character operated by the first player is on the left side while the initial position of a character operated by the second player is on the right side. That is, the character that can easily shoot a bullet from its initial position is selected for each player, thereby avoiding a situation that only one of the two players is disadvantaged. In another embodiment, even in the case of a single player, a character facing to the right may be changed to a character facing to the left if the initial position of the character in the game is on the right side.

In the exemplary embodiment, a character as a usage character is changed to another character in response to that a change condition is satisfied during the game. Therefore, the player uses a plurality of types of characters in one game. Moreover, the player uses a different combination of characters each time he/she plays a game. In the exemplary embodiment, the respective characters are different in the operation method. Therefore, in one type of game, the usage characters used in the game vary, whereby the strategic method and the fun factor of the game also vary. Thus, in the exemplary embodiment, since the usage character changes, the strategic method and the fun factor change even in one game, thereby providing many variations of games. Moreover, since the usage character changes, even in one type of game, the strategic method and the fun factor change each time the player plays the game, thereby preventing the player from getting tired of the game.

As described above, in the exemplary embodiment, the plurality of characters prepared in advance are different from each other in the movement method according to a direction input and a predetermined instruction input (e.g., an input to the motion instruction button). The game system 1, during execution of a game, performs a movement control for a usage character in the virtual space according to the movement method corresponding to the usage character, based on the direction input and the instruction input. Thus, in the exemplary embodiment, since the fundamental motion, "movement", differs among characters, the fun factor of the game greatly differs depending on which usage character is used in the game. Therefore, the variations of games can be increased due to the plurality of types of usage characters as described above.

In the exemplary embodiment, the direction input is an input to an analog stick, and the instruction input is an input to a button of a controller. However, any input device may be used for performing a direction input and an instruction input. For example, in another embodiment, a direction input and an instruction input may be inputs to a touch panel.

The methods for controlling movements of individual characters are arbitrary. In the exemplary embodiment, as movement control for at least any of a plurality of characters, the game system 1 performs movement control by using at least any of the following methods: (a) a method of moving a usage character in a direction according to a direction input (e.g., a movement control method for the character A); (b) a method of moving a usage character in a predetermined direction according to combination of a direction input and an instruction input (e.g., a movement control method for the character C, the character J, or the character Q); and (c) a method of automatically moving a usage character (e.g., a movement control method for the character G). In another embodiment, as movement control methods for the plurality of characters, not all the three methods described above need to be used, and at least one method out of the three methods may be used. Moreover, the movement control methods for the characters are not limited to the above three methods, and a character to be controlled by another method may be included in the plurality of characters.

In the exemplary embodiment, the plurality of characters include: characters of a first type (e.g., the character B) that are influenced by gravity in the virtual space; and characters of a second type (e.g., the character A) that are not influenced by gravity in the virtual space. When a usage character is a character of the first type, the game system 1, during execution of a game, performs movement control for the usage character with the influence of gravity being reflected. For example, the character of the first type is controlled to fall downward when it is in mid-air, or controlled to firstly move upward and then fall downward when an instruction of jumping is made. Meanwhile, when the usage character is a character of the second type, the game system 1, during execution of the game, performs movement control for the usage character without the influence of gravity being reflected. For example, a control of fall movement as described above is not performed to the character of the second type. Here, the operation feeling of the player to the character greatly differs depending on whether or not the movement control is performed with the influence of gravity being reflected, and therefore, the fun factor of the play target game greatly differs depending on which character is used, the first type or the second type. Thus, in the exemplary embodiment, since the two types of characters are included in the plurality of characters, the variations of games can be increased by the two types of characters.

In the exemplary embodiment, the game system 1 controls an attack motion of shooting an attack object (e.g., a bullet or a boomerang) according to an instruction input (e.g., an input to the motion instruction button), as a control of an attack motion of at least any of a plurality of characters. The game system 1 may control an attack motion of automatically shooting an attack object, as the control of the attack motion. For example, the character may be controlled to continue shooting bullets, regardless of the input to the motion instruction button. Thus, preparing the character capable of performing the attack object shooting motion results in an increase in variations of motions of the characters, thereby increasing the variations of games using the plurality of types of characters.

Hereinafter, an example of a game executed in the exemplary embodiment will be described. In the exemplary embodiment, it is assumed that first to fourth games described below are executed according to the game program. However, the number of games to be executed according to the game program is arbitrary, and any number of games not less than one may be executed. For example, in another embodiment, games different from the first to fourth games may be executed, and the first to fourth games may not necessarily be executed.

[2-2. First Game]

Figure 8:
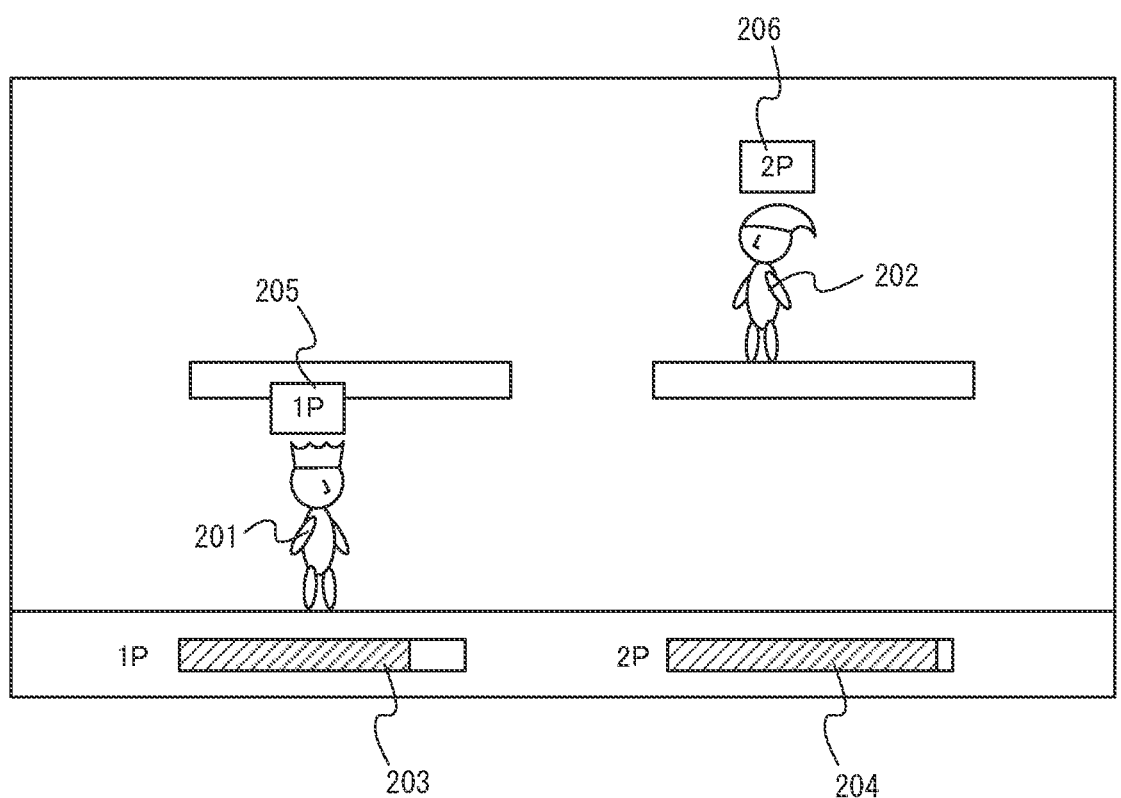
FIG. 8 shows an example of a game image in a non-limiting first game.

Hereinafter, a first game will be described with reference to FIGS. 8 to 10. FIG. 8 shows an example of a game image of the first game. As shown in FIG. 8, in the first game, the game system 1 displays two usage characters 201 and 202 on the display device. In the exemplary embodiment, the display device on which various images are displayed may be the display 12 or a stationary monitor.

FIG. 8 shows a case where two players (hereinafter referred to as "first player" and "second player") play the first game by using the respective usage characters. However, the number of players playing the first game is arbitrary. Three or more players may play the first game, or a single player may play the first game.

In the first game, the game system 1 displays marks 205 and 206 indicating the players operating the usage characters, in association with the usage characters. Specifically, the usage character 201 operated by the first player is associated with the mark indicating the first player (in FIG. 8, a mark indicating "1P") 205, and the usage character 202 operated by the second player is associated with the mark indicating the second player (in FIG. 8, a mark indicating "2P") 206.

The first game is a fighting game in which the usage characters fight against each other. In the exemplary embodiment, a usage character attacks another usage character to reduce the physical strength of the other usage character. In the first game, a player, who has reduced the physical strength of another usage character to zero, wins. As shown in FIG. 8, the game image includes gauge images 203 and 204 indicating the physical strengths of the respective usage characters. The content of the first game is arbitrary. The first game is not limited to the fighting game, and may be a game of any genre.

Figure 9:
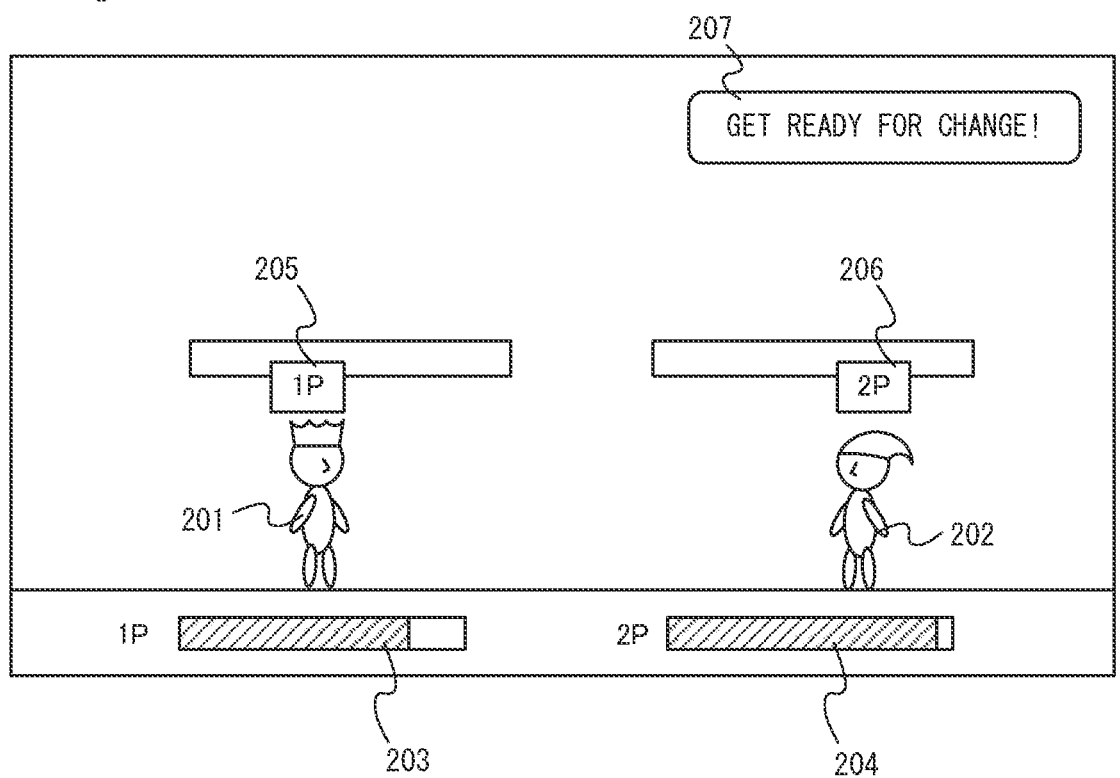
FIG. 9 shows an example of a game image immediately before usage characters are changed in the non-limiting first game.

FIG. 9 shows an example of a game image immediately before the usage characters are changed in the first game. In the exemplary embodiment, each usage character is changed to another character at a predetermined change timing in the first game. That is, the change condition in the first game is that the change timing has come. The change timing is, for example, a timing at which a predetermined time has elapsed from when the current usage character appears. That is, in the first game of the exemplary embodiment, the usage character is changed at intervals of the predetermined time. The change timing is arbitrary, and, for example, may be determined at random or may be a timing at which a predetermined condition has been satisfied (e.g., when the physical strength of any usage character has become equal to or lower than a predetermined value).

In the exemplary embodiment, the game system 1 displays a preannouncement image 207 announcing, before the change timing (e.g., a predetermined time before the change timing), that the usage character will be changed. In FIG. 8, the preannouncement image 207 is an image indicating a message "Get ready for change!". In another embodiment, the preannouncement image 207 may indicate a remaining time until the change timing. The preannouncement image 207 allows the player to know that the change timing will come soon.

When the change timing has come, the game system 1 performs change of the usage character. That is, the game system 1 determines, for each player, a usage character after the change (hereinafter also referred to as "post-change usage character") from among the prepared 18 types of characters. In the exemplary embodiment, the game system 1 automatically determines the usage character. The phrase "automatically determine" means that the game system 1 performs the determination independently of selection by the player. The phrase "automatically determine" means that the game system 1 performs the determination without considering selection by the player at the present time, and may mean that the game system 1 may perform the determination while considering selection by the player in the past, for example. That is, for example, if a game mode in which a player selects a desired character and plays the game is prepared in the game program, the game system 1 may determine the user character while considering the history of selection made in the game mode.

A specific method for automatically determining a usage character is arbitrary. In the exemplary embodiment, the game system 1 determines a usage character by selecting the same at random from among the prepared 18 types of characters. The phrase "selecting at random" means not only that the selection result becomes random in a strict sense, but also that, as for multiple times of trials (selections), the selection results are not the same.

In the case of determining a usage character at random, the game system 1 may determine a post-change usage character so that the current usage character is not selected. Moreover, for example, the game system 1 may determine a post-change usage character such that a player who is in a disadvantageous game situation at the time of the change (e.g., a player whose usage character has less remaining physical strength) can take advantage in progressing the game. Specifically, the game system 1 may cause a character, which is set to be compatible with the terrain in the game being played, to be easily selected as a post-change usage character for the player in the disadvantageous game situation.

In another embodiment, the game system 1 may determine a usage character by selecting the same from among the plurality of characters prepared, according to a predetermined rule. For example, the game system 1 may determine, as a usage character, a character that has been less frequently determined as a usage character.

As described above, the game system 1 determines a usage character by a method in which a usage character is not uniquely determined for one game (a specific method may be either the random selection method or the method according to the predetermined rule). Thus, the variations of game operations for one game can be increased, thereby preventing the player from getting tired of the game.

In the exemplary embodiment, the usage character at the start of the first game is determined at random from among the 18 types of characters prepared in the game program, like the usage character to be determined during the first game. However, the usage character at the start of the first game may be determined to a character that is selected by the player from among the 18 types of characters.

Figure 10:
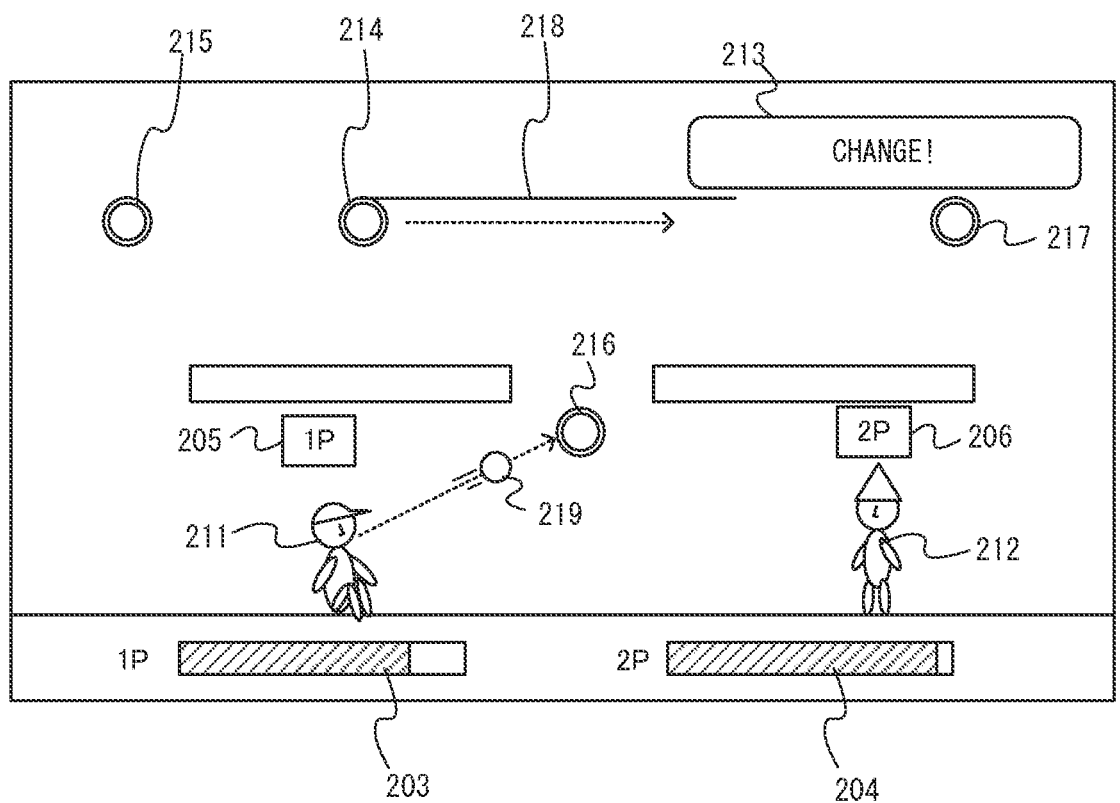
FIG. 10 shows an example of a game image after the usage characters have been changed in the non-limiting first game.

FIG. 10 shows an example of a game image after the usage characters have been changed in the first game. In FIG. 10, the usage character of the first player has been changed from the character 201 shown in FIG. 8 to a different character 211, and the usage character of the second player has been changed from the character 202 shown in FIG. 8 to a character 212 different therefrom. In the exemplary embodiment, each post-change usage character is disposed at the position where the pre-change usage character has been disposed. This reduces the possibility that the player loses sight of the post-change usage character.

In the exemplary embodiment, when the usage character has been changed, the game system 1 displays a notification image 213 notifying that the change has been made (in FIG. 10, an image indicating a message "Change!"). The notification image 213 notifies the player that the usage character has been changed. The notification image 213 is erased after a predetermined time (e.g., 5 seconds) has elapsed from the change.

As described above, in the exemplary embodiment, the game system 1 changes the usage character according to the lapse of time in the game while the game is being executed. In this case, since the character operation method is changed according to the lapse of time in the game, the player confirms the operation method and thinks of a strategic method each time the usage character is changed during the game. Thus, a highly entertaining game can be provided. In the first game, the usage character is changed regardless of the state (e.g., the physical strength) of the pre-change usage character. This makes it difficult for the player to predict a timing at which the usage character is changed, whereby the entertainment characteristics of the game can be further enhanced.

As described above, in the exemplary embodiment, the game system 1, during execution of the game, displays an image (e.g., the preannouncement image 207 or the notification image 213) indicating the timing at which the usage character is changed according to the lapse of time in the game. This can notify the player of the change of the usage character. Specifically, this display may preannounce, before the change, that the change will be performed (e.g., the preannouncement image 207) or may notify, on and/or after the change, that the change has been performed (e.g., the notification image 213).

In the exemplary embodiment, the timing at which the usage character is changed is the same among the respective players. This can ensure the fairness among the players. However, in another embodiment, the timing at which the usage character is changed may differ among the players. At this time, the game system 1 may change the usage character such that, for example, the number of times of change per predetermined time period (e.g., the number of times of change per game) is the same among the players. Also in this case, the fairness among the players can be ensured as in the exemplary embodiment. In the other embodiment, for example, in order to give a handicap to some of the plurality of players, the game system 1 may make the number of times of change per predetermined time period different among the players. For example, the game system 1 may make the number of times of change larger for a player in an advantageous game situation than for a player in a disadvantageous game situation, to increase the play difficulty level for the player in the advantageous game situation.

As shown in FIGS. 8 to 10, in the exemplary embodiment, even when the usage characters have been changed, display of the marks 205 and 206 is continued to indicate the players corresponding to the usage characters. As described above, since each post-change usage character is determined at random in the first game, there is a possibility that, when the usage character has been changed, each player no longer knows which usage character he/she is operating or loses sight of the usage character. In this regard, in the exemplary embodiment, display of the marks 205 and 206 is continued even after the usage characters have been changed, so that each player can easily know the post-change usage character to be operated by the player.

In the exemplary embodiment, as for the physical strength of the post-change usage character, the physical strength of the pre-change usage character is taken over. For example, if the physical strength value, immediately before the change, of the pre-change usage character is 80, the physical strength value, immediately after the change, of the post-change usage character is set to 80. Thus, in the exemplary embodiment, among parameters associated with the post-change usage character, the game system 1 uses, as the value of a parameter used for determining the game result (the value of physical strength used for determining a winner and a loser in the game), the value of the parameter regarding the pre-change usage character. The reason is as follows. If the physical strength of each post-change usage character is recovered (i.e., maximized), a player who has advantageously progressed the game before the change may have a feeling of unfairness, and moreover, a winner and a loser in the game may be less likely to be determined.

In the example shown in FIG. 10, objects for movement 214 to 217 are disposed in a game field. Each object for movement is an object that allows a character of a predetermined type (i.e., a special movement character described later) to move in the game field, and it is a ring-like object in the exemplary embodiment.

In the exemplary embodiment, the 18 types of characters include a character of a type that cannot be moved by only a direction input to the analog stick. In the exemplary embodiment, the character of this type is referred to as "special movement character". For example, the character C is a special movement character that performs a motion of changing its direction according to an input to the analog stick and a motion of shooting a bullet in the direction that it faces, but cannot move with these inputs. The objects for movement are disposed for the purpose of allowing such a special movement character to move in the game field.

In the example shown in FIG. 10, the character 211 is a special movement character (in FIG. 10, the character 211 is displayed in its sitting state as a display mode indicating that the character 211 is a special movement character). When a bullet 219 shot by the character 211 hits an object for movement, the game system 1 moves the character 211 to the position of the object for movement (see an arrow shown in FIG. 10). The character 211 at the position of the object for movement performs a motion of hanging on the object for movement. Thus, in the exemplary embodiment, the special movement character can move by hitting an object for movement with an attack object such as a bullet. Therefore, in the first game, the operation to a usage character and the fun factor differ between the case where the usage character is a special movement character and the case where the usage character is not a special movement character (but a character that moves in a direction according to a direction input, for example).

Although the objects for movement are omitted and not shown in the examples shown in FIGS. 8 and 9, the objects for movement are displayed in actuality. That is, in the exemplary embodiment, in the first game, the game system 1 disposes the objects for movement regardless of whether or not the current usage character is a special movement character. This prevents the objects for movement from being erased and disposed each time the usage character is changed. In another embodiment, the game system 1 may dispose the objects for movement while the special movement character appears in the game field, and may dispose no objects for movement while the special movement character does not appear in the game field.

In the example shown in FIG. 10, four objects for movement 214 to 217 are disposed in the game field. However, the number and positions of objects for movement in the game field are arbitrary. The number and positions of objects for movement may be appropriately set based on the game field, the clear condition, and/or the like of each game.

Moreover, the objects for movement may be movable in the game field, or may be fixedly disposed in the game field. In the example shown in FIG. 10, the object for movement 214 moves along a line 218 in the game field, while the objects for movement 215 to 217 are fixedly disposed in the game field. Each object for movement may start to move in response to that a character has moved to the position of the object for movement.

As described above, in the exemplary embodiment, if the post-change usage character is a predetermined character (e.g., a special movement character) that shoots an attack object (e.g., a bullet), the game system 1, during execution of the game, disposes an object for movement in the virtual space, and performs a movement control for moving the predetermined character toward the object for movement when the attack object comes into contact with the object for movement. Thus, in the exemplary embodiment, since the character, which moves in a movement method different from a movement method in which a character moves according to a simple direction input, is provided, it is possible to increase the variations of games using the plurality of types of characters.

[2-3. Second Game]

Figure 11:
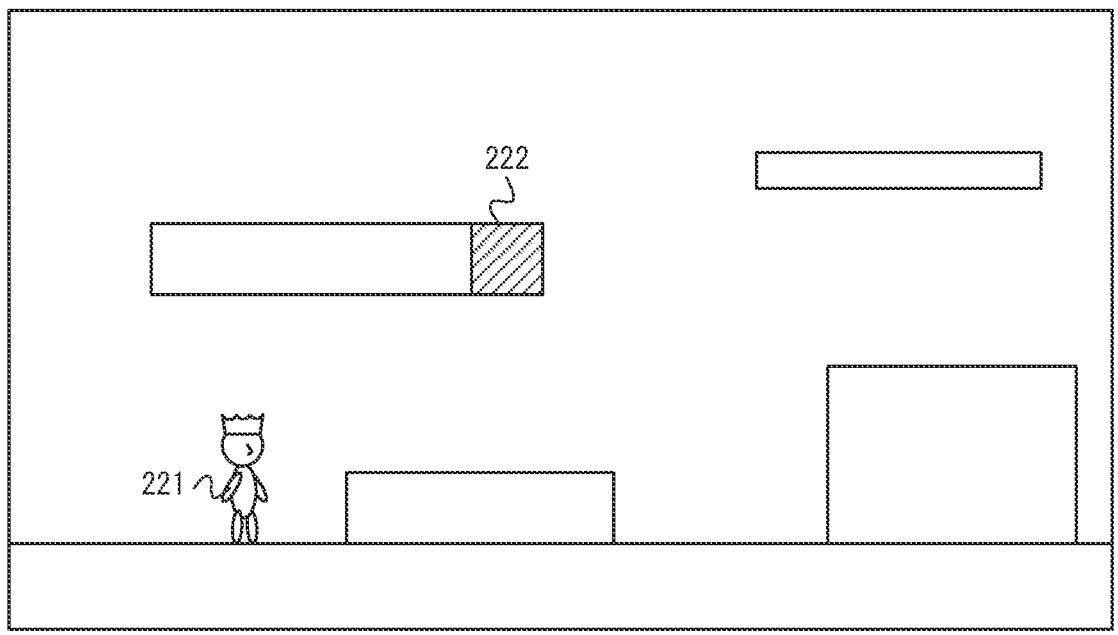
FIG. 11 shows an example of a game image in a non-limiting second game.

Hereinafter, a second game will be described with reference to FIGS. 11 to 13. FIG. 11 shows an example of a game image of the second game. As shown in FIG. 11, in the second game, the game system 1 displays one usage character 221 on the display device. Hereinafter, a case where the second game is played by one player will be described. The number of players playing the second game is arbitrary. A plurality of usage characters may be disposed in a game field so that a plurality of players can simultaneously play the second game. In the second game, the game field is scrolled rightward, and the usage character moves rightward to reach a goal.

In the exemplary embodiment, as in the first game, the usage character at the start of the second game is determined at random from among the 18 types of characters prepared in the game program. However, the usage character at the start of the second game may be determined to a character that is selected by the player from among the 18 types of characters. Alternatively, the usage character at the start of the second game may be fixed to a predetermined character.

As shown in FIG. 11, in the second game, a block 222 is disposed in the game field. Although described later in detail, the block 222 is an object that causes an item for changing the usage character to appear. Although one block is disposed in the game field shown in FIG. 11, the number and positions of blocks to be disposed are arbitrary.

Figure 12:
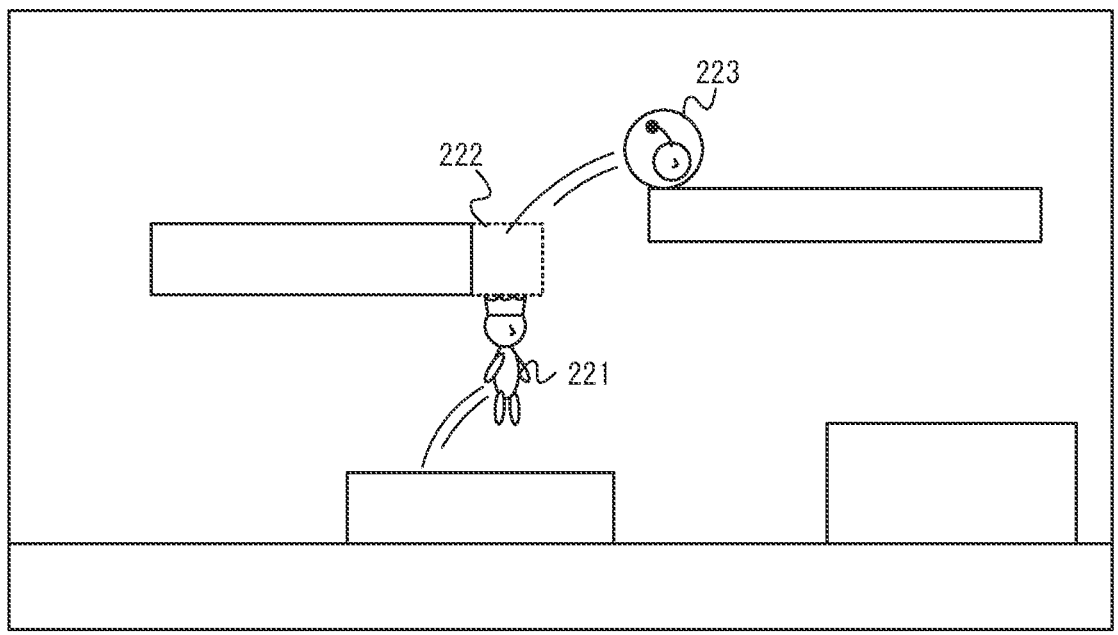
FIG. 12 shows an example of a game image in which an item appears in the non-limiting second game.

FIG. 12 shows an example of a game image in which the item appears in the second game. In the exemplary embodiment, when the usage character itself or an attack object shot by the user character has come into contact with the block, the game system 1 causes the item to appear from the block, and changes the display mode of the block to a mode indicating that the item has already appeared. In FIG. 12, the block 222 disappears and an item 223 appears in response to that the usage character 221 has come into contact with the block 222. The appearing item 223 may be fixedly disposed in the game field, or may be movable in the game field. In another embodiment, the item may not necessarily appear in response to disappearance of the block, and may be disposed in advance in the game field.

As described above, in the second game, the game system 1 performs, for each of a plurality of characters, a control of causing a predetermined object (e.g., a block) in a virtual space to generate a predetermined effect (e.g., appearance of an item) when the character has come into contact with the predetermined object. Moreover, the game system 1 performs, for a character that shoots an attack object among the plurality of characters, a control of causing the predetermined object to generate the same effect as that generated by the character coming into contact with the object, when the attack object has come into contact with the predetermined object. As described above, in the exemplary embodiment, even the character incapable of shooting an attack object can cause the predetermined object to generate the same effect as that generated by the character capable of shooting an attack object. Therefore, it is possible to avoid an inconvenient situation that a game cannot be cleared with a character incapable of shooting an attack object.

The specific content of the predetermined effect is arbitrary, and is not limited to appearance of an item as described above. As for the predetermined effect, various effects may be set according to objects. For example, when an object is an item that the usage character can acquire, the game system 1 may generate, as the above effect, an effect that the usage character acquires the item in response to the above contact.

Figure 13:
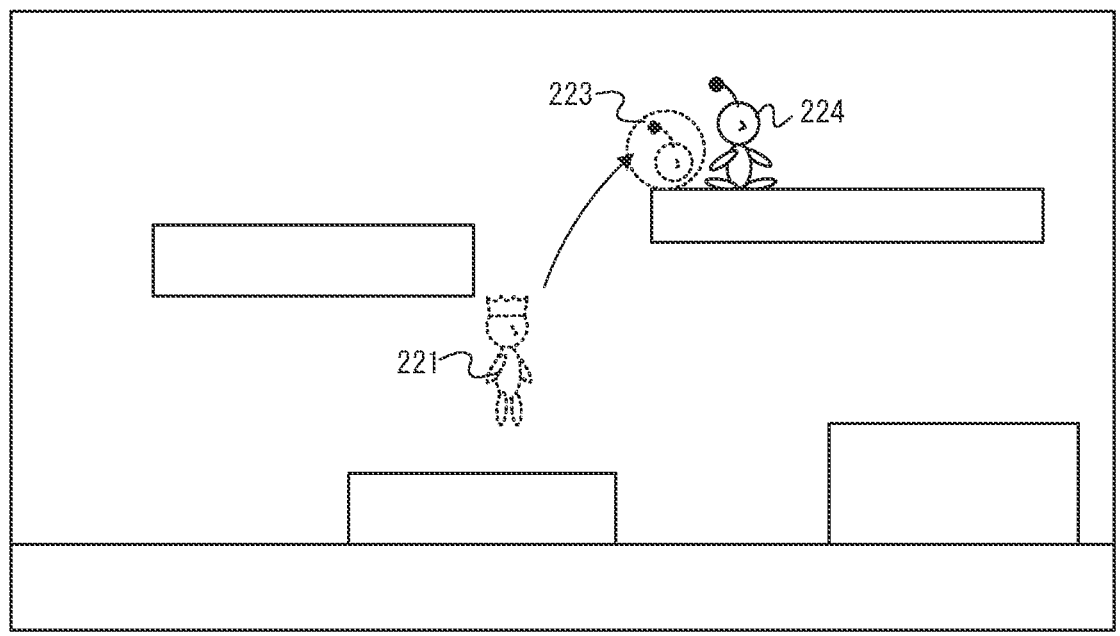
FIG. 13 shows an example of a game image after a usage character has been changed in the non-limiting second game.

FIG. 13 shows an example of a game image after the usage character has been changed in the second game. In the exemplary embodiment, when the usage character (or the attack object shot by the usage character) has come into contact with the item, the user character acquires the item. The game system 1 changes the usage character in response to that the usage character has acquired the item. In the example shown in FIG. 13, the usage character 221 is changed to a usage character 224 in response to that the usage character 221 has acquired the item 223. That is, the change condition in the second game is that the usage character acquires the item. Thus, in the second game, the player can select whether or not to change the usage character, according to his/her game operation.

In the second game, the item indicates the post-change character caused by acquisition of the item. For example, in the example shown in FIGS. 12 and 13, the item 223 indicates the face of a character that will be the usage character 224 after the change. Specifically, when the game system 1 causes an item to appear, the game system 1 determines a post-change usage character, and causes an item indicating the determined post-change usage character to appear. The method of determining a post-change usage character in the second game may be the same as the determination method of the first game.

As described above, in the second game, the appearing item allows the player to check the post-change usage character that will appear when the item is acquired. Thus, the player can select whether or not to acquire the item after checking the character indicated by the item. In another embodiment, the item may be displayed in a mode in which the item does not indicate the post-change usage character. In this case, the player should select whether or not to acquire the item (i.e., whether or not to change the usage character) while he/she does not know what is the post-change usage character.

In the second game, if the usage character is the above special movement character, an object for movement is disposed in the game field. That is, the game system 1 disposes the object for movement when the special movement character appears in the game field, and does not dispose the object for movement when no special movement character appears in the game field. Therefore, when the state where no special movement character appears in the game field has transitioned to the state where the special movement character appears in the game field according to the change of the usage character, the object for movement is disposed in the game field.

As described above, in the exemplary embodiment, when the usage character has acquired the predetermined item in the virtual space during execution of the game, the game system 1 changes the usage character to a character associated with the acquired item (i.e., a character indicated by the item) among the plurality of characters. This allows the player to easily select whether or not to change the usage character, and moreover, allows the player to easily determine a timing to change the usage character.

[2-4. Third Game]

Figure 14:
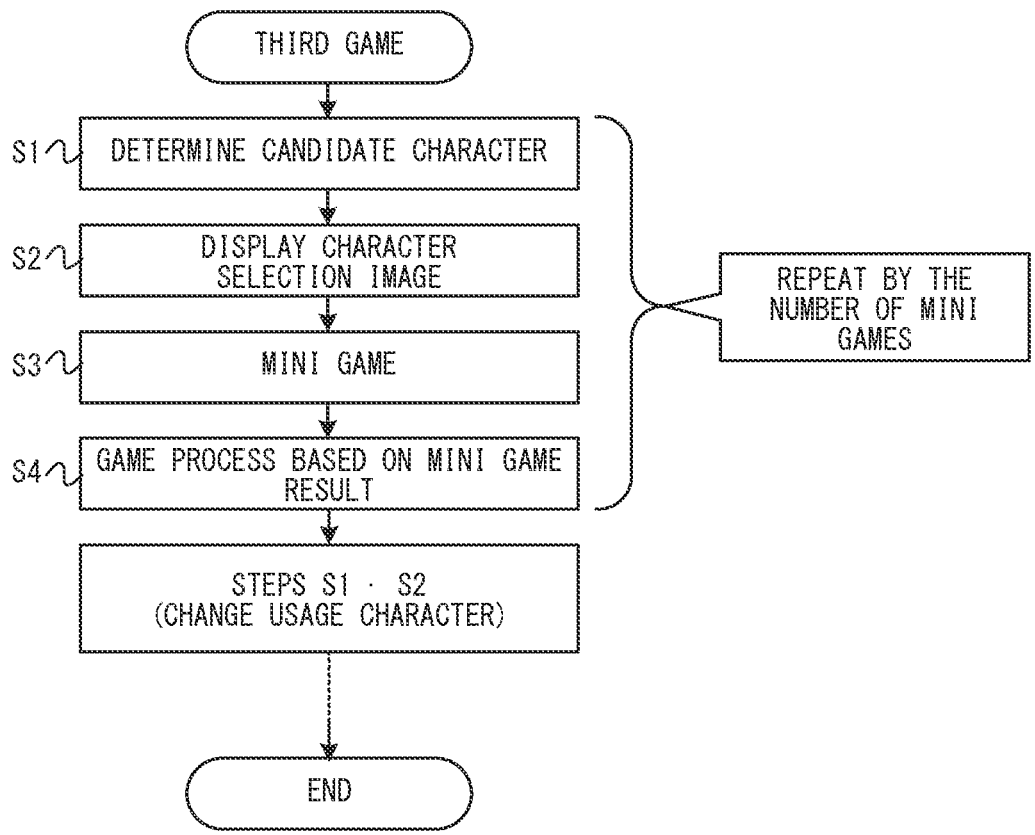
FIG. 14 shows an example of a game flow in a non-limiting third game.

Hereinafter, a third game will be described with reference to FIGS. 14 to 16. FIG. 14 shows an example of a game flow in the third game. The third game includes a plurality of mini games. That is, a plurality of mini games are performed in one third game, and the game result (e.g., winner/loser) of the third game is determined based on the results of the respective mini game. Hereinafter, a case where the third game is played by two players (hereinafter referred to as "first player" and "second player") will be described. However, the number of players playing the third game is arbitrary. Three or more players may play the third game, or a single player may play the third game.

As shown in FIG. 14, in the third game, a series of processes in steps S1 to S4 is executed for each mini game. In the exemplary embodiment, the series of processes in steps S1 to S4 per mini game is repeated by the number of the mini games, thereby progressing the third game.

When a mini game is performed in the third game, the game system 1 firstly determines candidate characters from among the prepared 18 types of characters (step S1). The candidate characters are candidates for usage characters to be used by players in the mini game. In the exemplary embodiment, characters as many as the number of players (i.e., two) are determined as the candidate characters. However, in another embodiment, the number of candidate characters may be larger than the number of players.

The method of selecting/determining candidate characters is arbitrary. In the exemplary embodiment, the game system 1 determines candidate characters such that a character whose preset compatibility with a mini game to be played next is good and a character whose preset compatibility with the mini game is poor, are equally selected. Moreover, the balance in selecting candidate characters (i.e., selection probability of each character) varies depending on the progress state of the third game and/or the winner/loser in each mini game in the third game. The method of determining (in other words, selecting) candidate characters from among the plurality of characters may be performed at random, or may be the same as the usage character determination method in the first game or the second game.

After the candidate characters have been determined, the game system 1 displays a character selection image on the display device (step S2). The character selection image is a game image for each player to select a usage character that he/she wants to use, from among the candidate characters.

Figure 15:
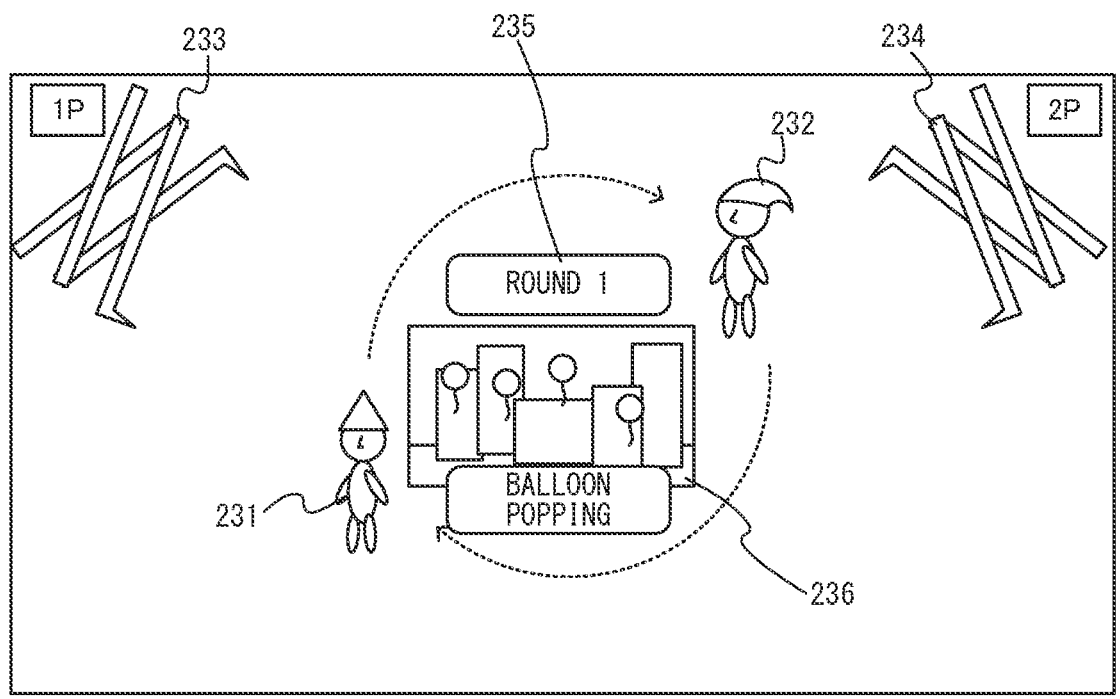
FIG. 15 shows an example of a character selection image in the non-limiting third game.
Figure 16:
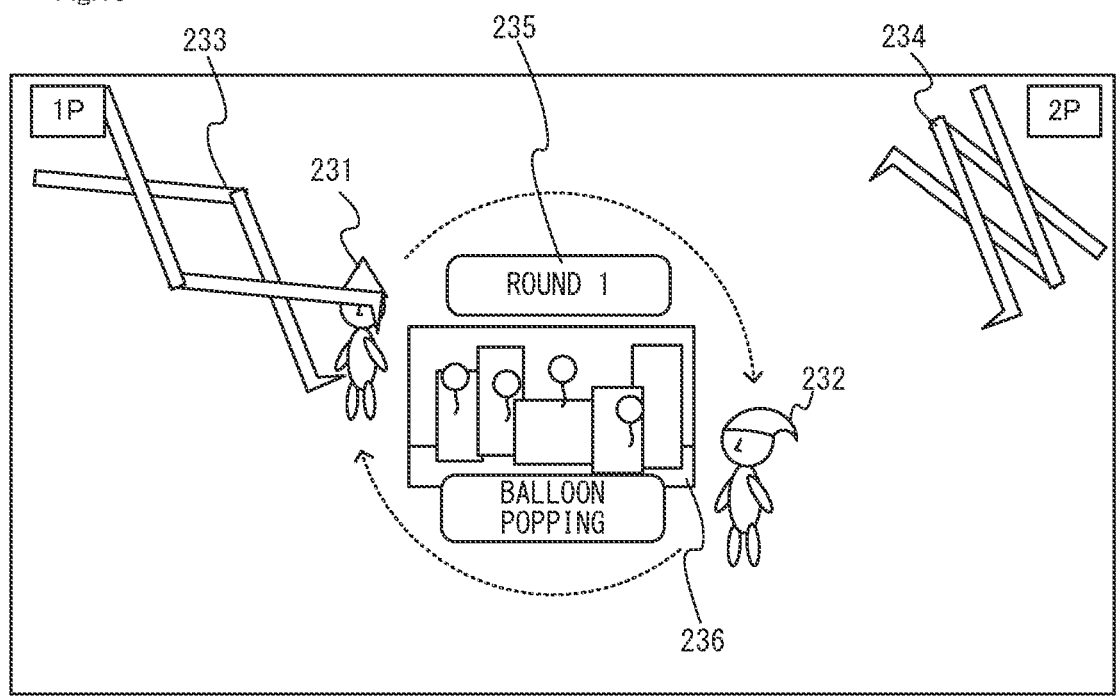
FIG. 16 shows an example of a character selection image in the non-limiting third game.

FIGS. 15 and 16 show an example of the character selection image in the third game. As shown in FIGS. 15 and 16, the character selection image includes candidate characters 231 and 232 determined in step S1. In the exemplary embodiment, the candidate characters 231 and 232 in the character selection image move to rotate along a circle (see dotted line arrows in FIGS. 15 and 16).

The character selection image further includes arms 233 and 234. The arms are objects for catching the candidate characters, and are operated by the respective players. In the character selection image, arms as many as the number of the players are disposed. In FIGS. 15 and 16, the arm 233 is operated by the first player, and the arm 234 is operated by the second player. FIG. 15 shows the state where the arm 233 is contracted, and FIG. 16 shows the state where the arm 233 is expanded. The game system 1 controls each arm such that the arm is expanded from its contracted state, according to a predetermined instruction input performed by the player. If a candidate character is located at a distal end of an arm when the arm is expanded (see FIG. 16), the player corresponding to this arm acquires the candidate character. That is, in the above case, the candidate character becomes the usage character of the player. In the example shown in FIG. 16, since the arm 233 operated by the first player catches the candidate character 231, the candidate character 231 is the usage character of the first player.

In the third game, a time period during which each player can operate the arm is set such that the time period becomes shorter for an advantaged player (e.g., a player having a larger number of wins in the mini games in the third game being played) although the time period is the same among the players at the beginning of the game. During the time period, each player can get a desired candidate character as his/her usage character by catching the character earlier than the other player by operating the arm. In the exemplary embodiment, the moving speed of each candidate character is relatively high at the time when display of the character selection image is started, and then is gradually decreased. Therefore, in the exemplary embodiment, catching a desired candidate character is difficult immediately after the start of the time period, but gradually becomes easy with the lapse of time.

As described above, in the third game, a usage character is assigned to each player from among the candidate characters selected at random. Therefore, also in the third game, as in the first and second games, each player cannot always designate a desired character as a usage character.

As shown in FIGS. 15 and 16, the character selection image includes a round number image 235, and a game content image 236. The round number image 235 indicates the current round number (i.e., what number the current mini game is) in this third game. The game content image 236 indicates the content of a mini game to be performed next. In the example shown in FIGS. 15 and 16, the game content image 236 indicates a thumbnail image of the mini game and the name of the mini game (balloon popping). In the exemplary embodiment, the game content image 236 being displayed allows the player to select a usage character while checking the content of the mini game.

In the exemplary embodiment, when usage characters have been determined for the respective players, the game system 1 ends the display of the character selection image. When there is only one player whose usage character is not yet determined and only one candidate character is left, the game system 1 may end the display of the character selection image and determine the left candidate character as a usage character for this player.

After the display of the character selection image has ended, the game system 1 executes the mini game using the respective usage characters (step S3). That is, in the mini game, each player plays the mini game by using the usage character determined in step S2. The content of the mini game is arbitrary. For example, the same games as the first game and/or the second game may be executed in the third game as the mini games in the third game. In the exemplary embodiment, the mini games in the third game have different contents. However, in another embodiment, the same mini game may be performed a plurality of number of times. Even in this case, since the usage characters differ among the mini games, the variations of games can be increased. Moreover, a plurality of mini games to be performed in the third game may be determined in advance, or may be selected by a predetermined method (e.g., at random) from among a plurality of mini games prepared in advance.

When the mini game has ended, the game system 1 executes a game process based on the result of the mini game (step S4). This game process is a process for determining the game result of the third game (e.g., a winner and a loser in the third game), based on the result of the mini game. For example, in the exemplary embodiment, as the game process, a process for a game for determining a winner and a loser in the third game (referred to as "winner/loser determination game) is executed. The content of the winner/loser determination game is arbitrary. In the exemplary embodiment, a game in which each player puts up a flag in the game field is performed as the winner/loser determination game. Specifically, a player who wins the mini game can put up a flag in the game field, and can gain, as his/her acquisition area, an area surrounded by his/her flags. In the third game, a player having the largest acquisition area is a winner of the game. Thus, in the exemplary embodiment, a player who wins more mini games in the third game and therefore puts up more flags is more likely to be a winner of the third game. The specific content of the game process is arbitrary. For example, in another embodiment, the game process may be a process of giving a score to each player, based on the result of the mini game. In this case, the game system 1 may determine the result of the third game, based on the scores that each player has earned through the mini games.

In the third game, a series of processes in steps S1 to S4 is repeated by the number of the mini games included in the third game. That is, after the processes in steps S1 to S4 have been executed for one mini game, the game system 1 executes the processes in steps S1 to S4 again for the next mini game. At this time, by the processes in steps S1 and S2, a usage character different from that in the previous mini game is assigned to each player (note that there are cases where the usage character in the previous mini game and the usage character in this mini game happen to be the same). Therefore, by the processes in the second or subsequent steps S1 and S2 in the third game, the usage characters of the players are changed in the third game. That is, the change condition in the third game is execution of the next mini game.

In the exemplary embodiment, a predetermined number of mini games, determined in the game program in advance, are executed in one third game. However, the number of mini games to be executed in one third game is arbitrary. For example, in another embodiment, the number of mini games may be designated by the player. Moreover, for example, the game system 1 may end the third game even if not all the predetermined number of mini games have been done at a time when a winner and a loser of the third game are determined.

As described above, in the third game of the exemplary embodiment, the game system 1, during execution of the game, automatically determines a plurality of candidate characters as candidates for usage characters from among a plurality of characters. Moreover, the game system 1, during execution of the game, displays the plurality of candidate characters (FIGS. 15 and 16), and determines post-change usage characters for a plurality of players from among the plurality of candidate characters, according to instructions of the players (e.g., instructions of expanding arms). Since the candidate characters as the candidates for usage characters are presented to the players, it is possible to give each player an opportunity to think of a strategic method for the game, before the usage character is changed. Thus, the strategic characteristics of the game can be enhanced.

The phrase "determine a usage character according to an instruction of a player" means determining the user character with the instruction of the player as a trigger, and may mean determining the user character by a method in which the player is allowed, to some extent, to select a desired character, or may mean determining the user character by a method in which it is impossible (or difficult) for the player to select a desired character. For example, in another embodiment, the game system 1 may determine a usage character by using a roulette. At this time, the game system 1 may receive, from the player, an instruction to stop the roulette rotating at a high speed, and may stop the roulette according to the instruction. In this case, it is difficult for the player to select a desired character from among the candidate characters.

[2-5. Fourth Game]

Figure 17:
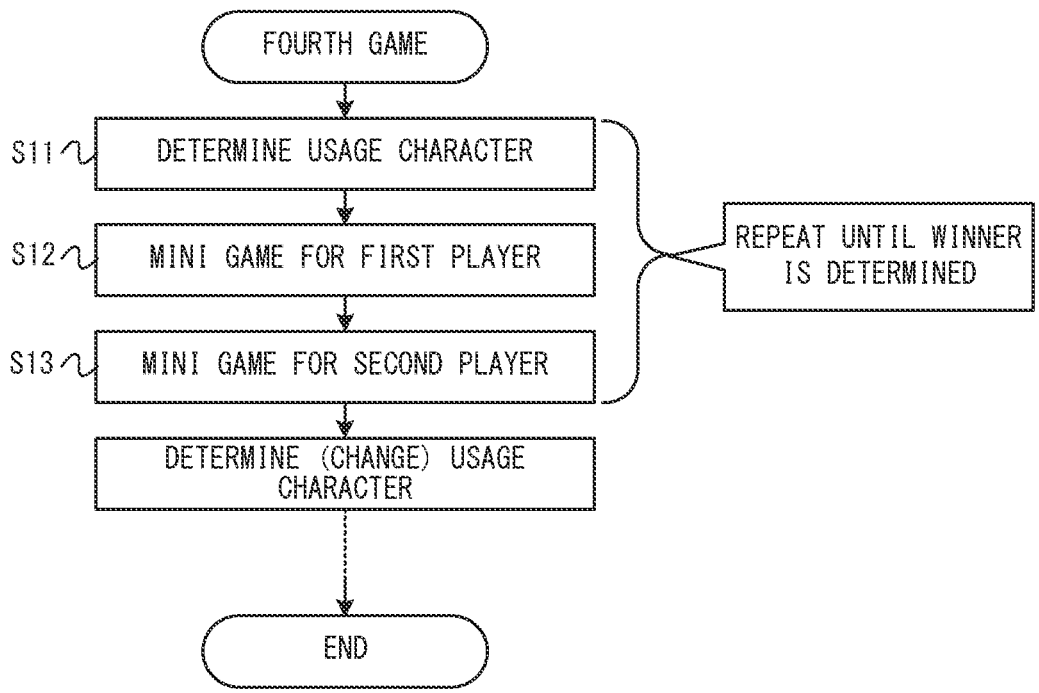
FIG. 17 shows an example of a game flow in a non-limiting fourth game.

Hereinafter, a fourth game will be described with reference to FIG. 17. FIG. 17 shows an example of a game flow in the fourth game. Like the third game, the fourth game includes a plurality of mini games. The fourth game is played by a plurality of players. Hereinafter, a case where the fourth game is played by two players (hereinafter referred to as "first player" and "second player") will be described.

As shown in FIG. 17, in the fourth game, a series of processes in steps S11 to S13 is executed for one mini game. In the exemplary embodiment, the series of processes in steps S11 to S13 is executed for each mini game, thereby progressing the fourth game.

When a mini game is performed in the fourth game, the game system 1 firstly determines a usage character for a player (step S11). In the fourth game, as in the first game, the game system 1 determines the usage character at random from among the prepared 18 types of characters. A specific method for determining the usage character in the fourth game may be the same as the usage character determination method in the first game or the second game.

After the usage character has been determined, the game system 1 starts a mini game to be played by the first player (step S12). In the fourth game, the respective players do not simultaneously play one mini game, but play the mini game one by one. That is, in the mini game in step S12, the first player plays the game by using the usage character determined in step S11.

The contents of the mini games in the fourth game are arbitrary, that is, the mini games may have any contents. For example, the same games as the first game and/or the second game may be executed in the fourth game as the mini games in the fourth game. A plurality of mini games to be executed in the fourth game may be determined in advance, or may be selected by a predetermined method (e.g., at random) from among a plurality of mini games prepared in advance.

When the mini game by the first player has ended, the game system 1 starts a mini game to be played by the second player (step S13). In the exemplary embodiment, the mini game to be played varies from player to player. In another embodiment, the first player and the second player may play the same mini game. The usage character in the mini game in step S13 is the same as the usage character determined in step S11, i.e., the usage character used by the first player. Thus, in the fourth game, each player plays the mini game by using the same usage character.

In the fourth game, while one of the players is playing the mini game, the game system 1 causes the other player to play another game (referred to as "auxiliary game") different from the mini game. At this time, both the game image of the mini game and the game image of the auxiliary game are displayed on the display device. In the exemplary embodiment, the game system 1 executes, as the auxiliary game, a game of inflating a balloon, according to an input by the other player. The other player can continue the above input until the one player clears the mini game. That is, by quickly clearing the mini game, the one player can inhibit the other player from inflating the balloon too much.

In the exemplary embodiment, a player who bursts the balloon first is a winner of the fourth game. That is, in the fourth game, one player tries to clear the mini game as quickly as possible to inhibit the other player from inflating a balloon, and performs an input so as to quickly burst a balloon while the other player is playing the mini game. This prevents the other player from getting tired of the game while the one player is playing the mini game. Moreover, in the exemplary embodiment, the game result of the fourth game is determined based on not only the results of the mini games but also the results of the auxiliary games. Therefore, the entertainment characteristics of the game can be enhanced as compared to the case where the game result of the fourth game is determined by simply comparing the results of the mini games by the respective players.

In another embodiment, the game system 1 may cause the other player to wait without performing any game while the one player is playing the mini game. Moreover, in the other embodiment, the game system 1 may determine a winner and a loser of each mini game based on the result of the mini game, and may determine a winner and a loser of the fourth game based on the results of the respective mini games, as in the third game.

In the fourth game, the respective players play the mini game one by one. However, in another embodiment, in the fourth game, a plurality of players may simultaneously play the mini game. At this time, as in the exemplary embodiment, the game system 1 may change the usage characters of the respective players to be a common usage character.

When the mini game by the second player has ended, the game system 1 newly determines a usage character to be used in the next mini game (see FIG. 17). At this time, by the process of newly determining a usage character, a usage character different from that in the previous mini game is assigned to each player (note that there are cases where the usage character in the previous mini game and the usage character in this mini game happen to be the same). Therefore, by the process in the second or subsequent step S11 in the fourth game, the usage characters of the players are changed in the fourth game. That is, the change condition in the fourth game is execution of the next mini game.

As described above, in the fourth game of the exemplary embodiment, the game system 1, during execution of the game, changes each of the usage characters respectively used by the plurality of players to a common character selected from the plurality of characters. This makes the condition for the game fair among the respective players. For example, even when the usage characters are determined at random as in the exemplary embodiment, it is possible to reduce occurrence of advantages and disadvantages among the players. Moreover, when the respective players individually perform the same mini game, it is possible to eliminate advantages and disadvantages among the players by making the usage characters of the players common.

[3. Specific Example of Processing in Game System]

Next, a specific example of information processing in the game system 1 will be described with reference to FIGS. 18 to 22.

Figure 18:
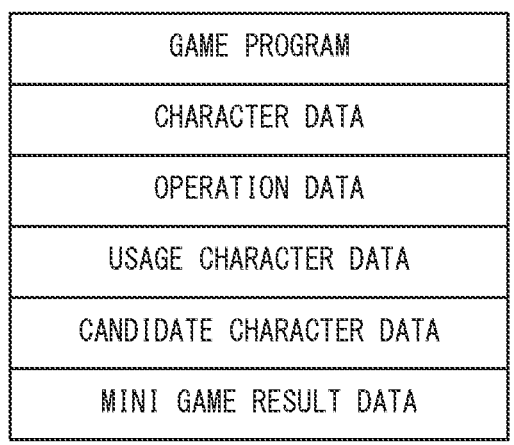
FIG. 18 shows an example of various data used for information processing in a non-limiting game system.

FIG. 18 shows an example of various data used for the information processing in the game system 1. The various data shown in FIG. 18 are stored in a storage medium (e.g., the flash memory 84, the DRAM 85, and/or a memory card attached to the slot 23) that is accessible by the main body apparatus 2.

As shown in FIG. 18, the game system 1 stores therein a game program. The game program is a game program for executing game processes (specifically, game processes shown in FIGS. 19 to 22) according to the exemplary embodiment. The game system 1 stores therein character data, the operation data, candidate character data, usage character data, and mini game result data.

The character data indicates a plurality of characters prepared in the game program. For example, the character data includes: data indicating the appearances of the characters; and data indicating control methods for the characters (i.e., what motions the characters take according to an input by the player).

The operation data is data indicating an operation performed by the player. As described above, the operation data is transmitted from the controllers 3 and 4 to the main body apparatus 2 and is stored in the main body apparatus 2. In the exemplary embodiment, the operation data includes input data indicating inputs to the respective input sections described above.

The usage character data is data indicating a character determined as a usage character among the plurality of characters indicated by the character data. The usage character data is, for example, data of identification information that allows identification of each character.

The candidate character data is data indicating characters determined as candidate characters in the above third game, among the plurality of characters indicated by the character data. For example, the candidate character data is data of identification information that allows identification of each character.

The mini game result data is data indicating the game results of the mini games included in the above third game. Specifically, in the exemplary embodiment, the mini game result data indicates the game situation in the above winner/loser determination game.

Figure 19:
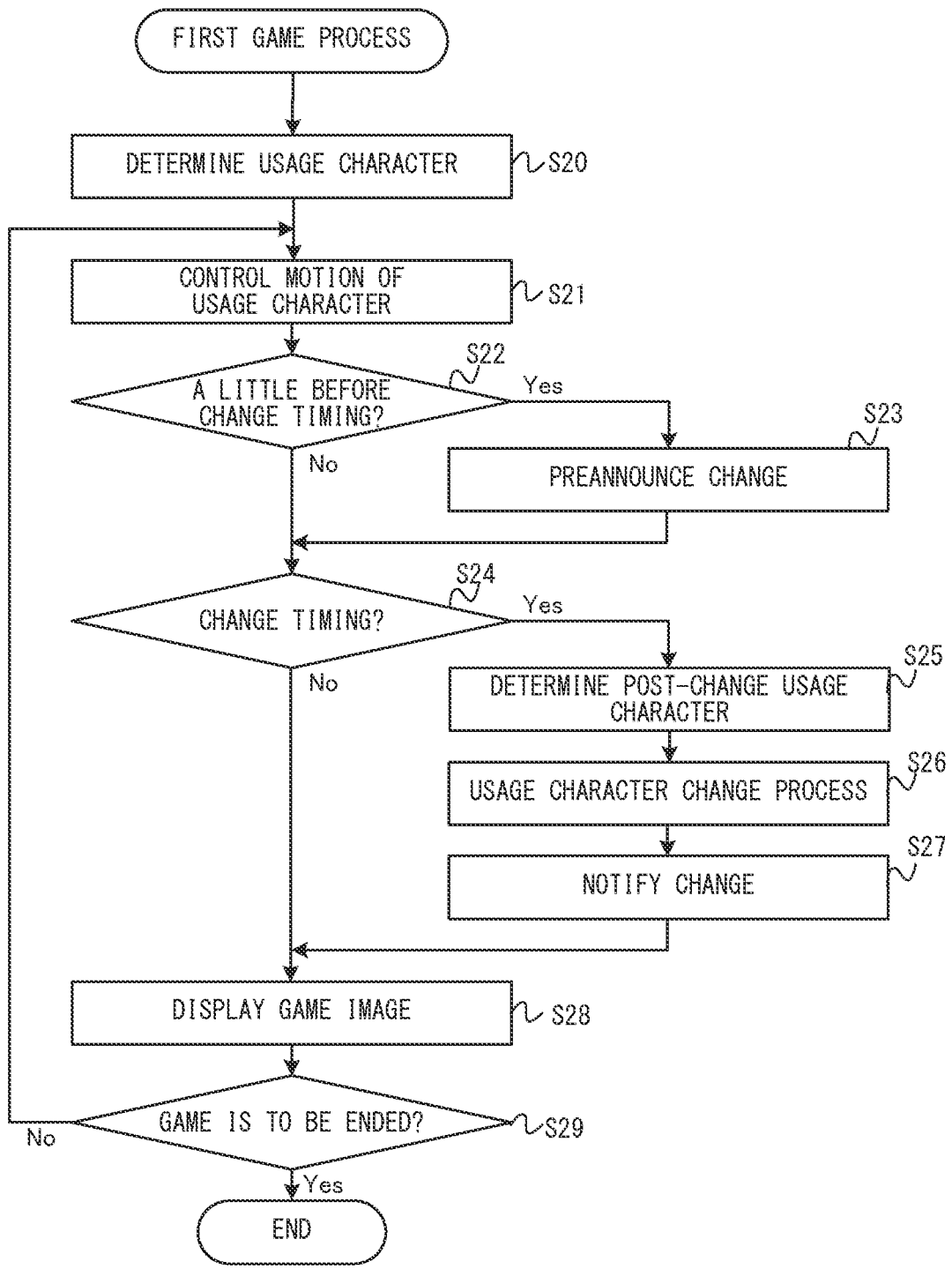
FIG. 19 is a flowchart showing an example of a flow of a first game process executed by the non-limiting game system.

FIG. 19 is a flowchart showing an example of a flow of a first game process executed by the game system 1. The first game process is a game process for performing the above first game. The first game process is started in response to that an instruction of starting the first game is performed by the player while, for example, a menu image is displayed, during execution of the game program.

In the exemplary embodiment, the processor 81 of the main body apparatus 2 executes the game program stored in the game system 1, thereby executing processes in steps shown in FIGS. 19 to 22. However, in another embodiment, a part of the processes in the steps may be executed by a processor (e.g., a dedicated circuit or the like) other than the processor 81. If the game system 1 is communicable with another information processing apparatus (e.g., a server), a part of the processes in the steps shown in FIGS. 19 to 22 may be executed by the other information processing apparatus. The processes in the steps shown in FIGS. 19 to 22 are merely examples, and the processing order of the steps may be changed or another process may be executed in addition to (or instead of) the process in each step, so long as similar results can be obtained.

The processor 81 executes the processes in the steps shown in FIGS. 19 to 22 by using a memory (e.g., the DRAM 85). That is, the processor 81 stores, in the memory, information (in other words, data) obtained in each process step, and reads out the information from the memory when using the information in the subsequent process steps.

In step S20 shown in FIG. 19, the processor 81 determines a usage character to be used in the first game. The usage character is determined according to the method described in the above "[2-2. First game]". The usage character determined in step S20 is a usage character to be used by each player at the start of the first game. At this time, the processor 81 updates the usage character data stored in the storage medium so as to indicate the determined usage character. Next to step S20, the process in step S21 is executed.

In step S21, the processor 81 controls the motion of the usage character in the first game, according to an input for operating the usage character by the player. That is, based on the operation data stored in the storage medium, the processor 81 determines inputs to the analog stick and the motion instruction button and controls the motion of the usage character according to the inputs. If there are a plurality of usage characters (i.e., a plurality of players) in the first game, the processor 81, according to an input by each player, controls the motion of the usage character corresponding to the player. If an enemy character or a moving object appears in the game field, the processor 81 performs a control of causing the enemy character to take a motion or a control of causing the object to move. Next to step S21, the process in step S22 is executed.

In step S22, the processor 81 determines whether or not a timing, which is a little before a change timing to change the usage character, has come. That is, the processor 81 determines whether or not a timing a predetermined time (e.g., 3 seconds) before the change timing has come. When the determination result in step S22 is positive, the process in step S23 is executed. When the determination result in step S22 is negative, the process in step S24 is executed.

In step S23, the processor 81 performs a process of preannouncing the change of the usage character to the player. Specifically, the processor 81 performs setting so as to display the preannouncement image (see FIG. 9) preannouncing that the usage character will be changed. That is, an object indicating the preannouncement image is disposed in the game field. At this time, in a display process in step S28 described later, a game image including the preannouncement image is displayed based on the setting. The setting regarding the display of the preannouncement image is maintained until the change timing comes. Next to step S23, the process in step S24 is executed.

In step S24, the processor 81 determines where or not the change timing to change the usage character has come. When the determination result in step S24 is positive, the process in step S25 is executed. When the determination result in step S24 is negative, the process in step S28 is executed.

In step S25, the processor 81 determines a post-change usage character. The post-change usage character is determined according to the method described in the above "[2-2. First game]". At this time, the processor 81 updates the usage character data stored in the storage medium so as to indicate the determined post-change usage character. Next to step S25, the process in step S26 is executed.

In step S26, the processor 81 executes a usage character change process for changing the usage character. Specifically, the processor 81 changes the usage character disposed in the game field to the character determined in step S25. Thus, a game field in which the post-change usage character is disposed is generated. Next to step S26, the process in step S27 is executed.

In step S27, the processor 81 performs a process of notifying the player of the change of the usage character. Specifically, the processor 81 performs setting so as to display the notification image (see FIG. 10) notifying the change of the usage character. That is, the processor 81 disposes an object indicating the notification image in the game field. In the display process in step S28 described later, a game image including the notification image is displayed based on the setting. The setting regarding the display of the notification image is maintained until a predetermined time (e.g., 5 seconds) elapses from the change timing. Next to step S27, the process in step S28 is executed.

In step S28, the processor 81 generates the game image of the first game, and causes the display device to display the same. That is, the processor 81 generates the game image including the game field, the usage character representing the motion controlled in step S21, other objects, and the like. When the setting has been performed in step S23 or S27, the processor 81 generates the game image further including the preannouncement image or the notification image. The game image thus generated is displayed on the display device. The game image generating process in step S28 is repeatedly executed once every predetermined time (e.g., 1 frame time). Next to step S28, the process in step S29 is executed.

In step S29, the processor 81 determines whether or not to end the first game. For example, when the condition for ending the first game has been satisfied (e.g., when a winner player of the first game has been determined or when the first game has been cleared), or when an instruction of ending the first game has been made by the player, the processor 81 determines to end the first game. Meanwhile, when the condition for ending the first game is not yet satisfied and an instruction of ending the first game is not made by the player, the processor 81 determines not to end the first game. When the determination result in step S29 is negative, the process in step S21 is executed again. Thereafter, a series of processes in steps S21 to S29 is repeatedly executed until it is determined in step S29 to end the first game. When the determination result in step S29 is positive, the processor 81 ends the first game process shown in FIG. 19.

Figure 20:
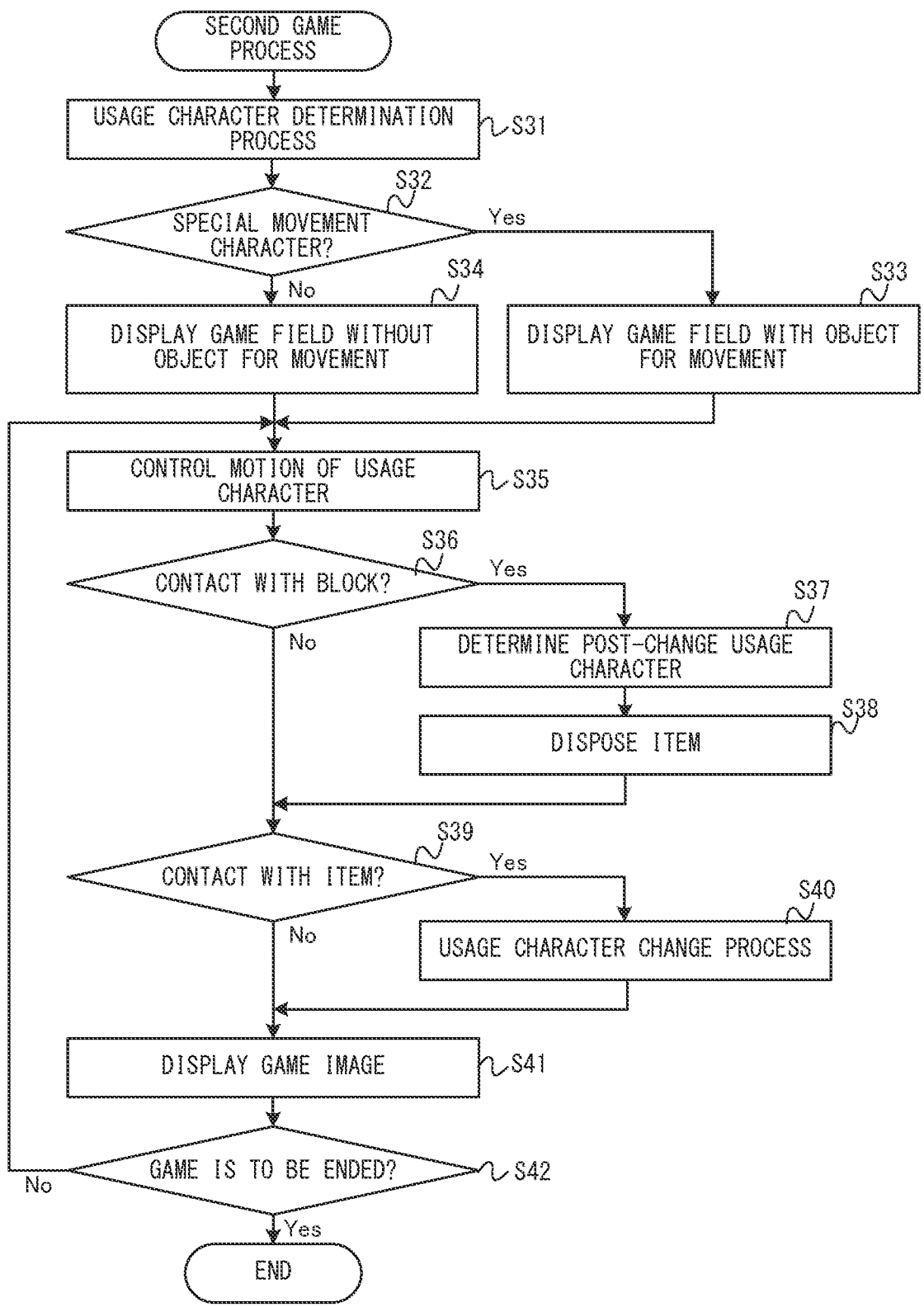
FIG. 20 is a flowchart showing an example of a flow of a second game process executed by the non-limiting game system.

FIG. 20 is a flowchart showing an example of a flow of a second game process executed by the game system 1. The second game process is a game process for performing the above second game. The second game process is started in response to that an instruction of starting the second game is performed by the player while, for example, the menu image is displayed, during execution of the game program.

In step S31 shown in FIG. 20, the processor 81 determines a usage character to be used in the second game. The usage character is determined according to the method described in the above "[2-3. Second game]". The usage character determined in step S31 is a usage character to be used by each player at the start of the second game. At this time, the processor 81 updates the usage character data stored in the storage medium so as to indicate the determined usage character. Next to step S31, the process in step S32 is executed.

In step S32, the processor 81 determines whether or not the determined usage character is the above special movement character. The processor 81 performed the above determination, based on the character data and the usage character data stored in the storage medium. When the determination result in step S32 is positive, the process in step S33 is executed. When the determination result in step S32 is negative, the process in step S34 is executed.

In step S33, the processor 81 generates, as a game field of the second game, a game field in which an object for movement is disposed, and causes the display device to display a game image indicating the game field in which the object for movement is disposed. Next to step S33, the process in step S35 is executed.

In step S34, the processor 81 generates, as a game field of the second game, a game field in which an object for movement is not disposed, and causes the display device to display a game image indicating the game field in which the object for movement is not disposed. Next to step S34, the process in step S35 is executed.

In step S35, the processor 81 controls the motion of the usage character in the second game, according to an input for operating the usage character by the player. The process in step S35 may be the same as the process in step S21 in the first game. Next to step S35, the process in step S36 is executed.

In step S36, the processor 81 determines whether or not the usage character or an attack object shot by the usage character has come into contact with a block in the game field. When the determination result in step S36 is positive, the process in step S37 is executed. When the determination result in step S36 is negative, the processes in steps S37 and S38 are skipped and the process in step S39 is executed.

In step S37, the processor 81 determines a post-change usage character. The post-change usage character is determined according to the method described in the above "[2-3. Second game]". At this time, the processor 81 updates the usage character data stored in the storage medium so as to indicate the determined post-change usage character. Next to step S37, the process in step S38 is executed. The determination of the post-change usage character may not necessarily be performed at this timing, and may be performed at the start of the second game.

In step S38, the processor 81 disposes an item indicating the post-change usage character, in the game field (see FIG. 12). Moreover, the processor 81 changes the display mode of the block. Next to step S38, the process in step S39 is executed.

In step S39, the processor 81 determines whether or not the usage character or an attack object shot by the usage character comes into contact with the item in the game field. When the determination result in step S39 is positive, the process in step S40 is executed. When the determination result in step S39 is negative, the process in step S40 is skipped and the process in step S41 is executed.

In step S40, the processor 81 executes a usage character change process for changing the usage character. Specifically, the processor 81 changes the usage character disposed in the game field to the character determined in the step S37, and switches the game field such that the object for movement is disposed when the usage character is the special movement character while the object for movement is not disposed when the usage character is not the special movement character. Thus, the post-change usage character is disposed in the game field, and the object for movement is disposed in the game field when the usage character is the special movement character. Next to step S40, the process in step S41 is executed.

In step S41, the processor 81 generates a game image of the second game, and causes the display device to display the game image. That is, the processor 81 generates the game image including: the game field according to whether or not the object for movement is disposed; the usage character representing the motion controlled in step S35; items in the game field; and the like. The game image thus generated is displayed on the display device. The game image generating/displaying process in step S41 is repeatedly executed once every predetermined time (e.g., 1 frame time). Next to step S41, the process in step S42 is executed.

In step S42, the processor 81 determines whether or not to end the second game. For example, when the condition for ending the second game has been satisfied (e.g., when the second game has been cleared), or when an instruction of ending the second game has been made by the player, the processor 81 determines to end the second game. Meanwhile, when the condition for ending the second game is not yet satisfied and an instruction of ending the second game is not made by the player, the processor 81 determines not to end the second game. When the determination result in step S42 is negative, the process in step S35 is executed again. Thereafter, a series of processes in steps S35 to S42 is repeatedly executed until it is determined in step S42 to end the second game. When the determination result in step S42 is positive, the processor 81 ends the second game process shown in FIG. 20.

Figure 21:
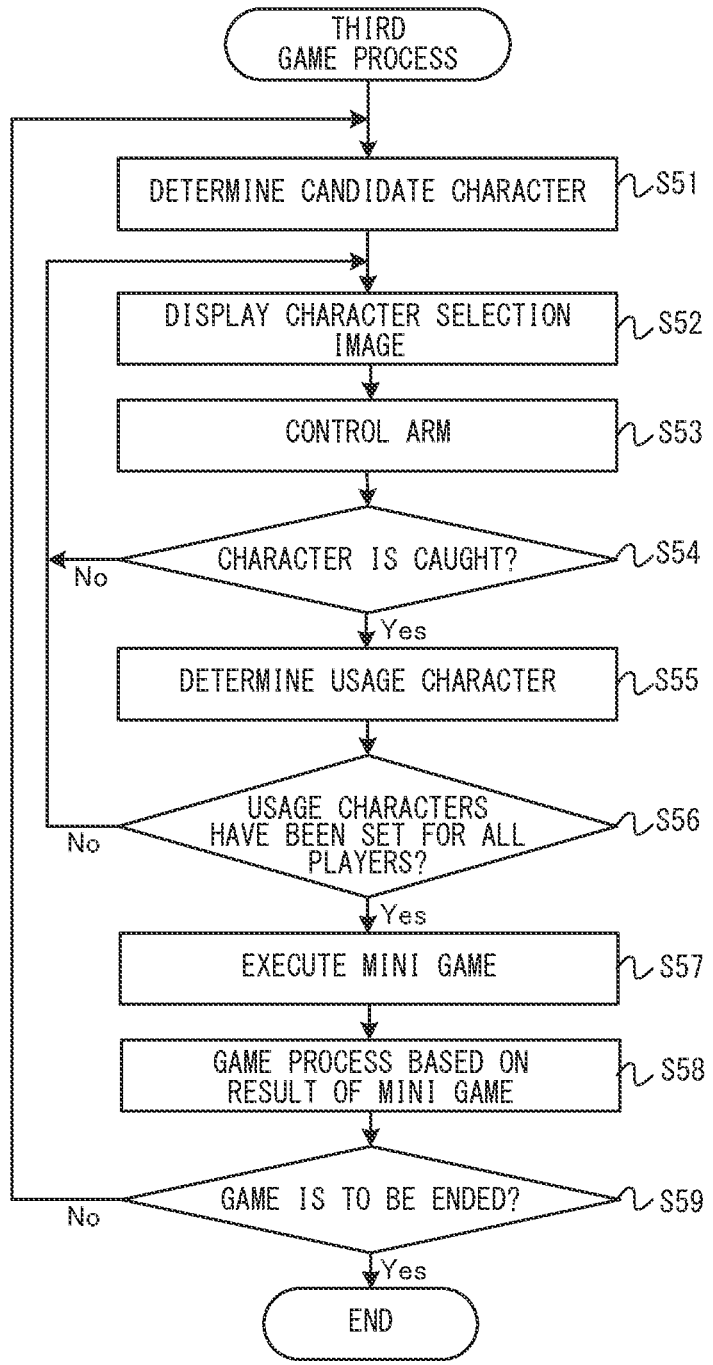
FIG. 21 is a flowchart showing an example of a flow of a third game process executed by the non-limiting game system.

FIG. 21 is a flowchart showing an example of a flow of a third game process executed by the game system 1. The third game process is a game process for performing the third game. The third game process is started in response to that an instruction of starting the third game is performed by the player while, for example, the menu image is displayed, during execution of the game program.

In step S51 shown in FIG. 21, the processor 81 determines candidate characters. The candidate characters are determined according to the method described in the above "[2-4. Third game]". Next to step S51, the process in step S52 is executed.

In step S52, the processor 81 generates the above character selection image (see FIG. 15), and causes the display device to display the same. The game image generating/displaying process in step S52 is repeatedly executed once every predetermined time (e.g., 1 frame time). Next to step S52, the process in step S53 is executed.

In step S53, the processor 81 controls the motion of an arm in the character selection image, according to an input by the player. That is, based on the operation data stored in the storage medium, the processor 81 determines an instruction input for expanding the arm, and performs a control to expand the arm according to the instruction input. Next to step S53, the process in step S54 is executed.

In step S54, the processor 81 determines whether or not the arm has caught a candidate character. When the determination result in step S54 is positive, the process in step S55 is executed. When the determination result in step S54 is negative, the process in step S52 is executed again.

In step S55, the processor 81 determines a usage character of the player who has caught the candidate character with the arm. That is, the candidate character caught by the arm is determined to be the usage character of this player. At this time, the processor 81 updates the usage character data stored in the storage medium so as to indicate the determined usage character. Next to step S55, the process in step S56 is executed.

In step S56, the processor 81 determines whether or not usage characters have been set for all the players in the third game. When the determination result in step S56 is negative, the process in step S52 is executed again. Thereafter, a series of processes in steps S52 to S56 is repeatedly executed until it is determined in step S56 that usage characters have been set for all the players. When the determination result in step S56 is positive, the process in step S57 is executed.

In step S57, the processor 81 executes one mini game included in the third game. That is, the processor 81 executes a game process of progressing the mini game by controlling the motion of each usage character determined in step S55, based on an operation by the player. The processor 81 ends the process in step S57 when the mini game has ended, and executes the process in step S58.

In step S58, the processor 81 executes a game process based on the result of the mini game executed in step S57. In the exemplary embodiment, the processor 81 executes a game process for the above winner/loser determination game. When all the mini games in the third game have been executed, a winner and a loser of the third game are determined based on the results of the winner/loser determination games, and causes the display device to display the winner/loser result. Next to step S58, the process in step S59 is executed.

In step S59, the processor 81 determines whether or not to end the third game. For example, when the condition for ending the third game has been satisfied (e.g., when all the mini games in the third game have been executed), or when an instruction of ending the third game has been made by the player, the processor 81 determines to end the third game. Meanwhile, when the condition for ending the third game is not yet satisfied and an instruction of ending the third game is not made by the player, the processor 81 determines not to end the third game. When the determination result in step S59 is negative, the process in step S51 is executed again. Thereafter, a series of processes in steps S51 to S59 is repeatedly executed until it is determined in step S59 to end the third game. When the determination result in step S59 is positive, the processor 81 ends the third game process shown in FIG. 21.

Figure 22:
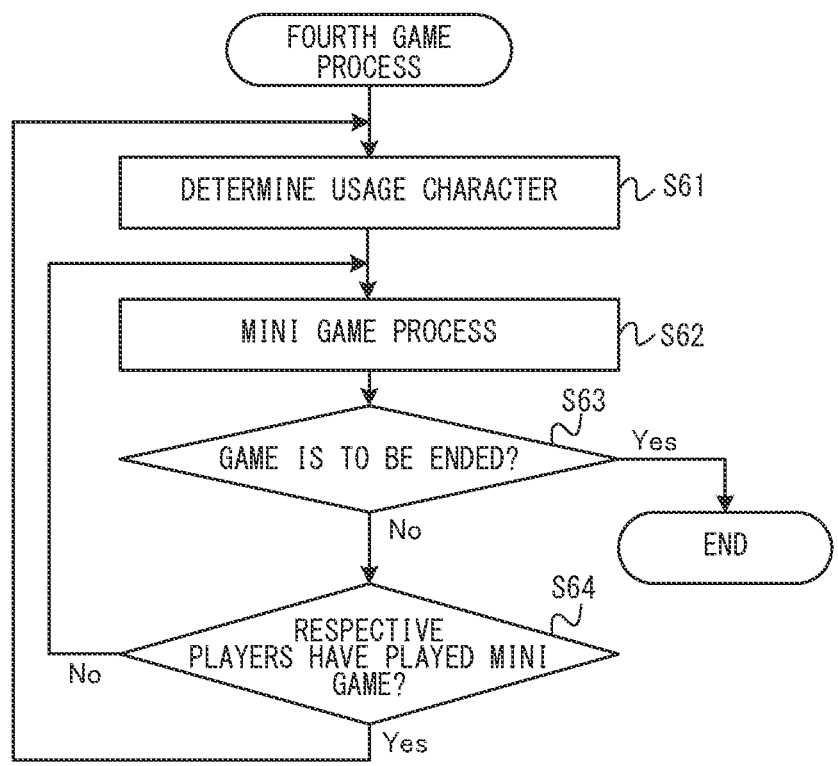
FIG. 22 is a flowchart showing an example of a flow of a fourth game process executed by the non-limiting game system.

FIG. 22 is a flowchart showing an example of a flow of a fourth game process executed by the game system 1. The fourth game process is a game process for performing the above fourth game. The fourth game process is started in response to that an instruction of starting the fourth game is performed by the player while, for example, the menu image is displayed, during execution of the game program.

In step S61 shown in FIG. 22, the processor 81 determines a usage character to be used in a mini game in the fourth game. The usage character is determined according to the method described in the above "[2-5. Fourth game]". Next to step S61, the process in step S62 is executed.

In step S62, the processor 81 executes one mini game included in the fourth game. That is, the processor 81 executes a game process of progressing the mini game by controlling the motion of the usage character determined in step S61, based on an operation of the player. In the exemplary embodiment, the above auxiliary game is executed together with the mini game. In step S62, the mini game is played by one player, and when the mini game played by this player has ended, the processor 81 ends the process in step S62. Next to step S62, the process in step S63 is executed.

In step S63, the processor 81 determines whether or not to end the fourth game. For example, when the condition for ending the fourth game has been satisfied (e.g., when a winner and a loser have been determined through the mini game and the auxiliary game executed in step S62), or when an instruction of ending the fourth game has been made by the player, the processor 81 determines to end the fourth game. Meanwhile, when the condition for ending the fourth game is not yet satisfied and an instruction of ending the fourth game is not made by the player, the processor 81 determines not to end the fourth game. When the determination result in step S63 is negative, the process in step S64 is executed again. When the determination result in step S63 is positive, the processor 81 ends the fourth game process shown in FIG. 22.

In step S64, the processor 81 determines whether or not each of the players of the fourth game has played the mini game executed in step S62. When the determination result in step S64 is negative, the process in step S62 is executed again. That is, the processes in steps S62 to S64 are repeatedly executed until each of the players has played the one mini game. When the determination result in step S64 is positive, the process in step S61 is executed again. That is, a usage character is determined again through the process in step S61, and a mini game using the usage character is executed through the process in step S62. Thereafter, the processes in steps S61 to S64 are repeatedly executed until it is determined in step S63 to end the fourth game.

[4. Function and Effect of Exemplary Embodiment, and Modifications]

As described above, in the exemplary embodiment, the information processing system (e.g., the game system 1) performs operations as follows:

Determining a usage character to be played by a player from among a plurality of characters whose operation methods are different from each other (steps S21, S31, S55, S61).

Executing a game by controlling a motion of the usage character in a virtual space, based on an operation by the player (steps S21, S35, S57, S62).

During execution of the game, changing the usage character to a different character among the plurality of characters (step S26, S40, S55, S61).

According to the above configuration, during execution of the game, the character being used by the player is changed to another character having a different operation method.

Thus, the game operation can be varied, thereby increasing the variations of game operations.

In the first, third, and fourth games according to the exemplary embodiment, the game system 1, during execution of the game, automatically determines a post-change usage character from among the plurality of characters. Thus, it is possible to provide a new and highly entertaining game during which the usage character is changed to a character that is not intended by the player.

In the first to fourth games according to the exemplary embodiment, the game system 1 determines a usage character at random from among the plurality of characters. Thus, it becomes difficult for the player to predict a usage character that he/she will use next, whereby the entertainment characteristics of the game during which the usage character is changed can be further enhanced.

In the first and third games according to the exemplary embodiment, the game system 1 executes the game by controlling, based on operations of a plurality of players, the motions of usage characters corresponding to the respective players in the virtual space. Moreover, the game system 1, during execution of the game, changes each of the usage characters to a character, among the plurality of characters, which is different from the current usage character. Since the usage characters of the plurality of players are changed during the game, the entertainment characteristics of the game can be enhanced, and the fairness among the players can be ensured.

In the exemplary embodiment, the characters are, for example, persons that appear in the game. However, the characters are not limited to persons, as long as the characters have individualities in game settings.

In another embodiment, the information processing system may not necessarily include a part of the components included in the exemplary embodiment, and may not necessarily perform a part of the processes performed in the exemplary embodiment. For example, in order to achieve a certain specific effect of the exemplary embodiment, the information processing system may include a component for producing the effect and perform a process for producing the effect, in other words, the information processing system may not necessarily include components other than the component and may not necessarily perform processes other than the process.

The exemplary embodiment is usable as, for example, a game system, a game program, and the like for the purpose of increasing the variations of game operations.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program,
the game program causing a processor of an information processing apparatus to execute:
determining a usage character to be operated by a player from among a plurality of characters whose operation methods are different from each other; and
executing a game by controlling a motion of the usage character in a virtual space, based on an operation by the player on a user interface, where the user interface has a plurality of operating elements,
during execution of the game, monitoring a spatial position of the usage character in the virtual space;

changing the usage character to a different character among the plurality of characters while the virtual space having the moving usage character is displayed on a display; and causing the post-changed usage character to be displayed in the virtual space on the display at the monitored spatial position in the virtual space which the usage character had at a time of the change.

2. The storage medium according to claim 1, wherein the game program causes the processor to execute, during execution of the game, automatically determining a post-change usage character from among the plurality of characters.

3. The storage medium according to claim 1, wherein the game program causes the processor to execute determining the usage character at random from among the plurality of characters.

4. The storage medium according to claim 2, wherein the game program causes the processor to execute, during execution of the game, changing the usage character according to a lapse of time in the game as determined by a timer.

5. The storage medium according to claim 4, wherein the game program causes the processor to further execute, during execution of the game, displaying, on the display, an image indicating a timing at which the usage character is changed according to the lapse of time in the game as determined by the timer.

6. The storage medium according to claim 1, wherein the game program causes the processor to execute:

executing the game by controlling, based on operations of a plurality of players, motions of usage characters corresponding to the respective players in the virtual space; and during execution of the game, changing each of the usage characters to a character, among the plurality of characters, which is different from the usage character that is currently used.

7. The storage medium according to claim 6, wherein the game program causes the processor to further execute:

during execution of the game, automatically determining a plurality of candidate characters to be candidates of the usage characters from among the plurality of characters;

during execution of the game, displaying the plurality of candidate characters; and during execution of the game, determining post-change usage characters of the respective players from among the plurality of candidate characters, according to instructions of the plurality of players.

8. The storage medium according to claim 1, wherein the game program causes the processor to execute, when the usage character has acquired a predetermined item in the virtual space during execution of the game, changing the usage character to a character associated with the acquired item among the plurality of characters.

9. The storage medium according to claim 6, wherein the game program causes the processor to execute, during execution of the game, changing each of the usage characters respectively used by the plurality of players to a common character selected from the plurality of characters.

10. The storage medium according to claim 1, wherein the plurality of characters are different from each other in a movement method according a direction input and a predetermined instruction input different from the direction input, and the game program causes the processor to further execute, during execution of the game, performing a movement control for the usage character in the virtual space, according to a movement method corresponding to the usage character, based on the direction input and the predetermined instruction input.

11. The storage medium according to claim 10, wherein the game program causes the processor to execute performing, as a movement control for at least any of the plurality of characters, a movement control by using at least any of: a method of moving the usage character in a direction according to the direction input; a method of moving the usage character in a predetermined direction according to a combination of the direction input and the predetermined instruction input; and a method of automatically moving the usage character.

12. The storage medium according to claim 10, wherein the game program causes the processor to further execute performing, as a control for an attack motion of at least any of the plurality of characters, a control for an attack motion of shooting an attack object automatically or according to the predetermined instruction input.

13. The storage medium according to claim 12, wherein the game program causes the processor to further execute:

performing, for each of the plurality of characters, a control of causing a predetermined object in the virtual space to generate a predetermined effect when the character has come into contact with the predetermined object; and performing, for a character that shoots the attack object among the plurality of characters, a control of causing the predetermined object to generate an effect when the attack object has come into contact with the predetermined object, the effect being the same as the effect generated when the character has come into contact with the predetermined object.

14. The storage medium according to claim 12, wherein the game program causes the processor to execute, during execution of the game, if a post-change usage character is a predetermined character that shoots the attack object, disposing an object for movement in the virtual space, and performing a movement control for moving the predetermined character toward the object for movement when the attack object has come into contact with the object for movement.

15. The storage medium according to claim 10, wherein the plurality of characters include a character of a first type that is influenced by gravity in the virtual space, and a character of a second type that is not influenced by gravity in the virtual space, and the game program causes the processor to execute, when the usage character is the character of the first type, performing a movement control for the usage character with an influence of gravity being reflected during execution of the game.

16. The storage medium according to claim 1, wherein the game program causes the processor to execute, determining whether a change condition is satisfied to change the usage character and in response to determining that the change condition is satisfied, changing the usage character to a different character among the plurality of characters.

17. The storage medium according to claim 16, wherein the determining is made during the execution of the game.

18. An information processing system comprising:
a display;
a user interface having a plurality of operating elements; and
one or more processors, the one or more processors cause the information processing system to:
determine a usage character to be operated by a player from among a plurality of characters whose operation methods are different from each other; and
execute a game by controlling a motion of the usage character in a virtual space, based on an operation by the player on the user interface,
during execution of the game,
monitor a spatial position of the usage character in the virtual space;
change the usage character to a different character among the plurality of characters while the virtual space having the moving usage character is displayed on the display; and
cause the post-changed usage character to be displayed in the virtual space on the display at the monitored spatial position in the virtual space which the usage character had at a time of the change.

19. The information processing system according to claim 18, wherein the one or more processors, during execution of the game, cause the information processing system to automatically determine a post-change usage character from among the plurality of characters.

20. The information processing system according to claim 18, wherein the one or more processors, cause the information processing system to determine the usage character at random from among the plurality of characters.

21. The information processing system according to claim 19, further comprising a timer, wherein the one or more processors, during execution of the game, cause the information processing system to change the usage character according to a lapse of time in the game as determined by the timer.

22. The information processing system according to claim 21, wherein the one or more processors, during execution of the game, cause the information processing system to display an image indicating a timing at which the usage character is changed according to the lapse of time in the game on the display as determined by the timer.

23. The information processing system according to claim 18, wherein the one or more processors cause the information processing system to
execute the game by controlling, based on operations of a plurality of players, motions of usage characters corresponding to the respective players in the virtual space, and
during execution of the game, change each of the usage characters to a character, among the plurality of characters, which is different from the usage character that is currently used.

24. The information processing system according to claim 23, wherein the one or more processors cause the information processing system to
during execution of the game, automatically determine a plurality of candidate characters to be candidates of the usage characters from among the plurality of characters,
during execution of the game, display the plurality of candidate characters, and
during execution of the game, determine post-change usage characters of the respective players from among the plurality of candidate characters, according to instructions of the plurality of players.

25. The information processing system according to claim 18, wherein the one or more processors cause the information processing system to, when the usage character has acquired a predetermined item in the virtual space during execution of the game, change the usage character to a character associated with the acquired item among the plurality of characters.

26. The information processing system according to claim 23, wherein the one or more processors, during execution of the game, cause the information processing system to change each of the usage characters respectively used by the plurality of players to a common character selected from the plurality of characters.

27. The information processing system according to claim 18, wherein the one or more processors cause the information processing system to determine whether a change condition is satisfied to change the usage character and in response to the information processing system determining that the change condition is satisfied, the information processing system changes the usage character to a different character among the plurality of characters.

28. The information processing system according to claim 27, wherein the one or more processors cause the information processing system to determine whether a change condition is satisfied during the execution of the game.

29. An information processing apparatus including one or more processors,
the one or more processors cause the information processing apparatus to:
determine a usage character to be operated by a player from among a plurality of characters whose operation methods are different from each other; and
execute a game by controlling a motion of the usage character in a virtual space, based on an operation by the player on a user interface, where the user interface has a plurality of operating elements,
during execution of the game,
monitor a spatial position of the usage character in the virtual space;
change the usage character to a different character among the plurality of characters while the virtual space having the moving usage character is displayed on a display; and
cause the post-changed usage character to be displayed in the virtual space on the display at the monitored spatial position in the virtual space which the usage character had at a time of the change.

30. The information processing apparatus according to claim 29, wherein the one or more processors, during execution of the game, cause the information processing apparatus to automatically determine a post-change usage character from among the plurality of characters.

31. The information processing apparatus according to claim 29, wherein the one or more processors cause the information processing apparatus to determine the usage character at random from among the plurality of characters.

32. The information processing apparatus according to claim 30, further comprising a timer, wherein the one or more processors, during execution of the game, cause the information processing apparatus to change the usage character according to a lapse of time in the game as determined by the timer.

33. The information processing apparatus according to claim 29, wherein the one or more processors cause the information processing apparatus to, when the usage character has acquired a predetermined item in the virtual space during execution of the game, change the usage character to a character associated with the acquired item among the plurality of characters.

34. The information processing apparatus according to claim 29, wherein the one or more processors cause the information processing apparatus to determine whether a change condition is satisfied to change the usage character and in response to the information processing apparatus determining that the change condition is satisfied, the information processing apparatus changes the usage character to a different character among the plurality of characters.

35. The information processing apparatus according to claim 34, wherein the one or more processors cause the information processing apparatus to determine whether a change condition is satisfied during the execution of the game.

36. A game processing method executed by an information processing system, comprising:
   determining a usage character to be operated by a player from among a plurality of characters whose operation methods are different from each other; and
   executing a game by controlling a motion of the usage character in a virtual space, based on an operation by the player on a user interface, where the user interface has a plurality of operating elements,
      during execution of the game,
         monitoring a spatial position of the usage character in the virtual space;
         changing the usage character to a different character among the plurality of characters while the virtual space having the moving usage character is displayed on a display; and
         causing the post-changed usage character to be displayed in the virtual space on the display at the monitored spatial position in the virtual space which the usage character had at a time of the change.

37. The game processing method according to claim 36, wherein, during execution of the game, a post-change usage character is automatically determined from among the plurality of characters.

38. The game processing method according to claim 36, wherein the usage character is determined at random from among the plurality of characters.

39. The game processing method according to claim 37, wherein, during execution of the game, the usage character is changed according to a lapse of time in the game as determined by a timer.

40. The game processing method according to claim 36, wherein, when the usage character has acquired a predetermined item in the virtual space during execution of the game, the usage character is changed to a character associated with the acquired item among the plurality of characters.

41. The game processing method according to claim 36, further comprising determining whether a change condition is satisfied to change the usage character and in response to determining that the change condition is satisfied, changing the usage character to a different character among the plurality of characters.

42. The game processing method according to claim 41, wherein the determining is made during the execution of the game.

43. A non-transitory computer-readable storage medium having stored therein a game program,
   the game program causing a processor of an information processing apparatus to execute:
      determining a usage character to be operated by a player from among a plurality of characters whose operation methods are different from each other;
      executing a game by controlling a motion of the usage character in a virtual space, based on an operation by the player on a user interface, where the user interface has a plurality of operating elements;
      during execution of the game, monitoring the game to determine whether a change condition is satisfied; and
      in response to determining that the change condition is satisfied, changing the usage character to a different character among the plurality of characters while the virtual space having the moving usage character is displayed on a display.

44. An information processing system comprising:
   a display;
   a user interface having a plurality of operating elements: and
   one or more processors, wherein the one or more processors cause the information processing system to:
      determine a usage character to be operated by a player from among a plurality of characters whose operation methods are different from each other;
      execute a game by controlling a motion of the usage character in a virtual space, based on an operation by the player on the user interface;
      during execution of the game, monitor the game to determine whether a change condition is satisfied; and
      in response to determining that the change condition is satisfied, change the usage character to a different character among the plurality of characters while the virtual space having the moving usage character is displayed on the display.

45. An information processing apparatus including one or more processors, the one or more processors causing the information processing apparatus to:
   determine a usage character to be operated by a player from among a plurality of characters whose operation methods are different from each other;
   execute a game by controlling a motion of the usage character in a virtual space, based on an operation by the player on a user interface, where the user interface has a plurality of operating elements;
   during execution of the game, monitor the game to determine whether a change condition is satisfied; and
   in response to determining that the change condition is satisfied, change the usage character to a different character among the plurality of characters while the virtual space having the moving usage character is displayed on the display.

46. A game processing method executed by an information processing system, comprising:
   determining a usage character to be operated by a player from among a plurality of characters whose operation methods are different from each other;
   executing a game by controlling a motion of the usage character in a virtual space, based on an operation by the player on a user interface, where the user interface has a plurality of operating elements;
      during execution of the game, monitoring the game to determine whether a change condition is satisfied; and in response to determining that the change condition is satisfied, change the usage character to a different character among the plurality of characters while the virtual space having the moving usage character is displayed on the display.

* * * * *